United States Patent [19]

Shima

[11] Patent Number: 5,150,221
[45] Date of Patent: Sep. 22, 1992

[54] SIMPLE ELECTRONIC FILE SYSTEM

[75] Inventor: Yasuji Shima, Yokohama, Japan

[73] Assignee: Tosoh Corporation, Shinnanyo, Japan

[21] Appl. No.: 465,195

[22] PCT Filed: Jul. 5, 1989

[86] PCT No.: PCT/JP89/00673
§ 371 Date: Feb. 28, 1990
§ 102(e) Date: Feb. 28, 1990

[87] PCT Pub. No.: WO90/00779
PCT Pub. Date: Jan. 25, 1990

[30] Foreign Application Priority Data

Jul. 7, 1988 [JP] Japan ............... 63-169524
Jul. 7, 1988 [JP] Japan ............... 63-169525
Jul. 9, 1988 [JP] Japan ............... 63-170036
Jul. 13, 1988 [JP] Japan ............... 63-174076
Aug. 29, 1988 [JP] Japan ............... 63-214343

[51] Int. Cl.⁵ .................. G06K 3/14; H04N 1/21
[52] U.S. Cl. .................. 358/403; 358/468; 360/48
[58] Field of Search ........... 358/401, 402, 403, 404, 358/444, 468; 364/521; 360/48

[56] References Cited

U.S. PATENT DOCUMENTS 4,445,195 4/1984 Yamamoto ............... 358/403
4,520,399 5/1985 Iida ............... 358/451

FOREIGN PATENT DOCUMENTS 0320713 6/1989 European Pat. Off. .
0435254 7/1991 European Pat. Off. .
2636192 3/1990 France .
0039671 2/1990 Japan .

Primary Examiner—Edward L. Coles, Sr.
Assistant Examiner—Jill Jackson
Attorney, Agent, or Firm—Oblon, Spivak, McClelland, Maier & Neustadt

[57] ABSTRACT

This invention relates to a copying or facsimile machine with an optical disk device (10) having a light detecting unit (130) for converting an optical image of a document into digital image information; an image storing unit (135) for storing the digital image information converted from the light detecting unit; a printer (140); an optical disk unit (150) for recording the digital image information in the optical disk contained in the replaceable optical disk cartridge in the unit of page; and a selection unit (136) for selecting whether the digital image information will be printed by the printer or not, and whether the digital image information be recorded by the optical disk unit or not; and a reproduction only optical disk device (30) having a selection unit (344) for selecting one of the pages recorded in the optical disk in the optical disk cartridge to be reproduced; an optical disk unit (322-340) for reading the digital image information of the page selected by the selection unit; and an image storing unit (350) for storing the digital image information read by the optical disk unit; and a flat display unit (312) for displaying the image information stored in the image storing unit. The copying machine with an optical disk device records in the optical disk the image information of the document in the unit of page, and the reproduction only optical disk device reproduces the image information recorded in the optical disk in the unit of page.

9 Claims, 19 Drawing Sheets

| CONTROL KEY | | DATA KEY | | | | | | | CONTROL KEY |
|---|---|---|---|---|---|---|---|---|---|
| | A | 7 B | 8 C | 9 D | − E | F | G | | ◁ |
| ENG/KAN/FIG | H | 4 1 | 5 J | 6 K | • L | M | N | | ▷ |
| C | O | 1 P | 2 0 R | 3 R | • S | T | U | | N−TRNS |
| AC | V | * W | 0 X | # Y | / Z | SPACE | SET | | TRNS/NEXT |

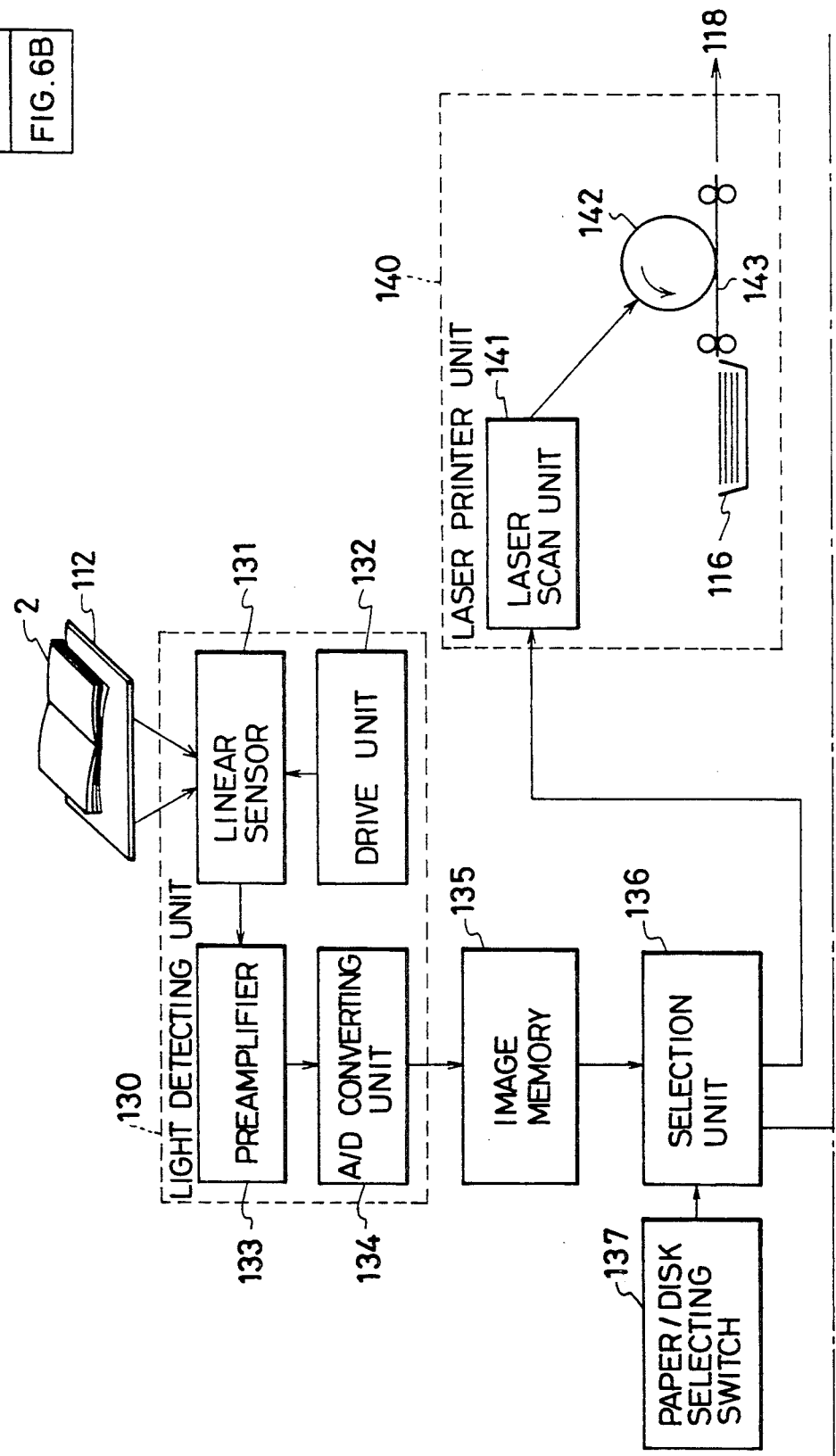

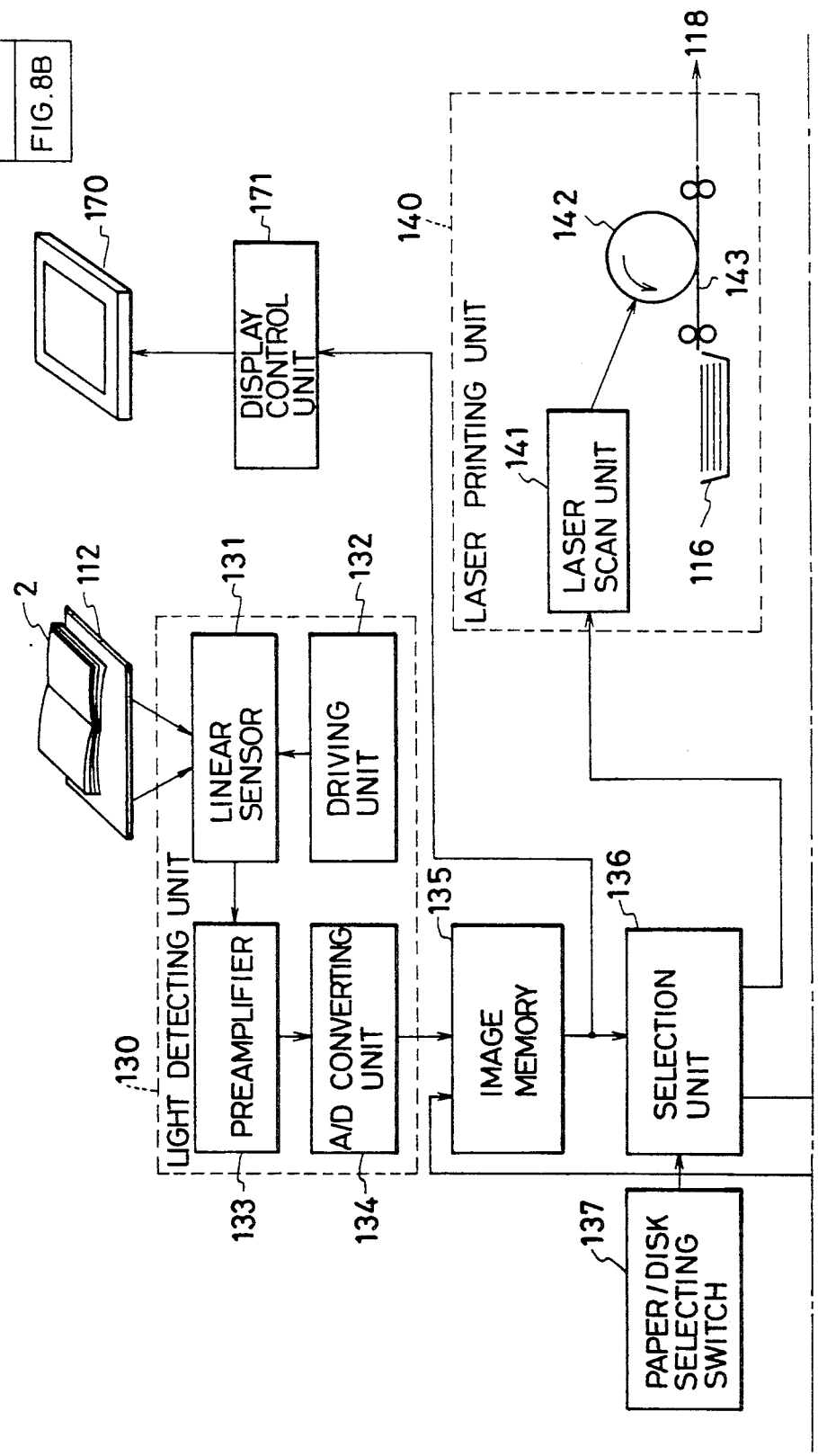

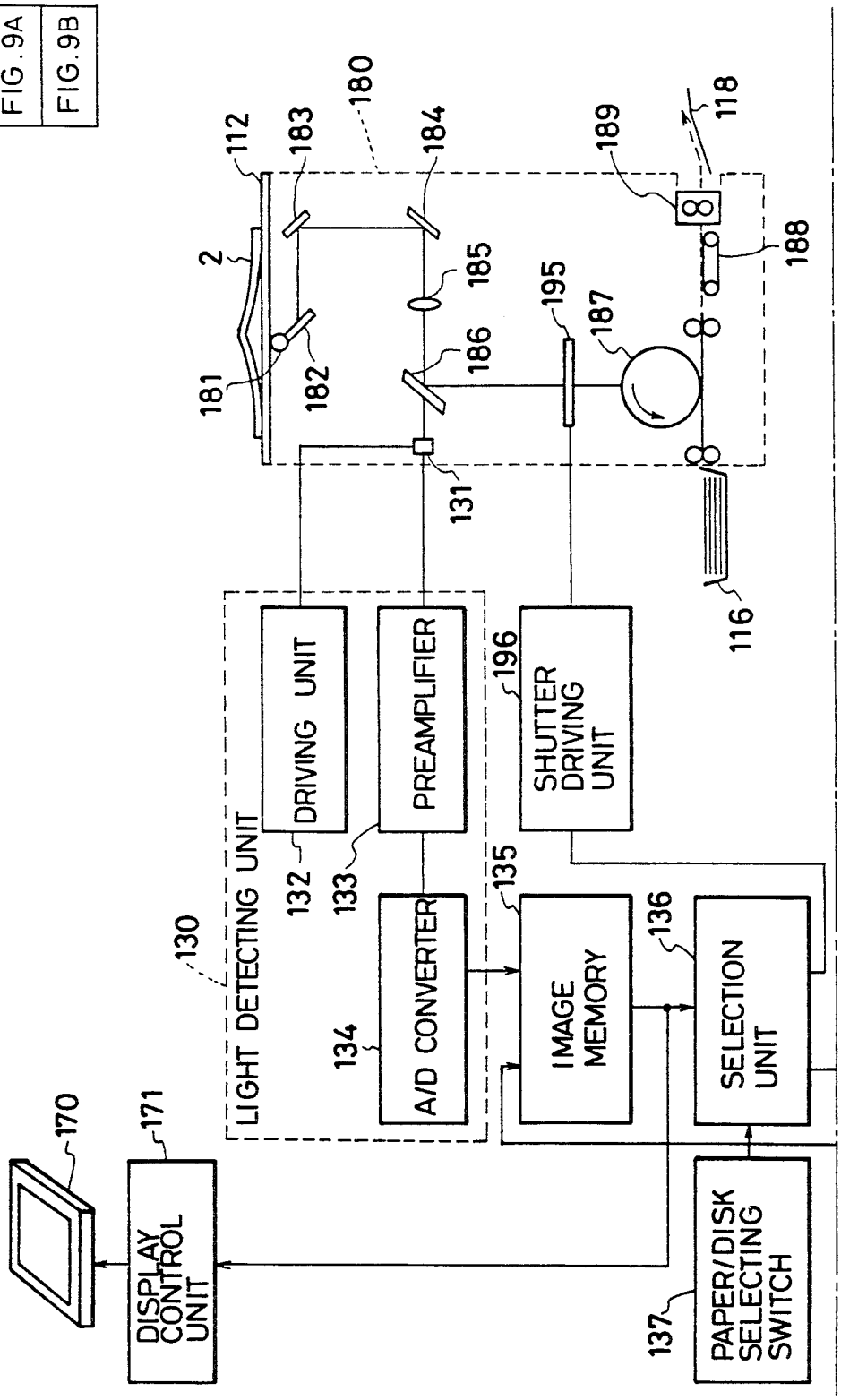

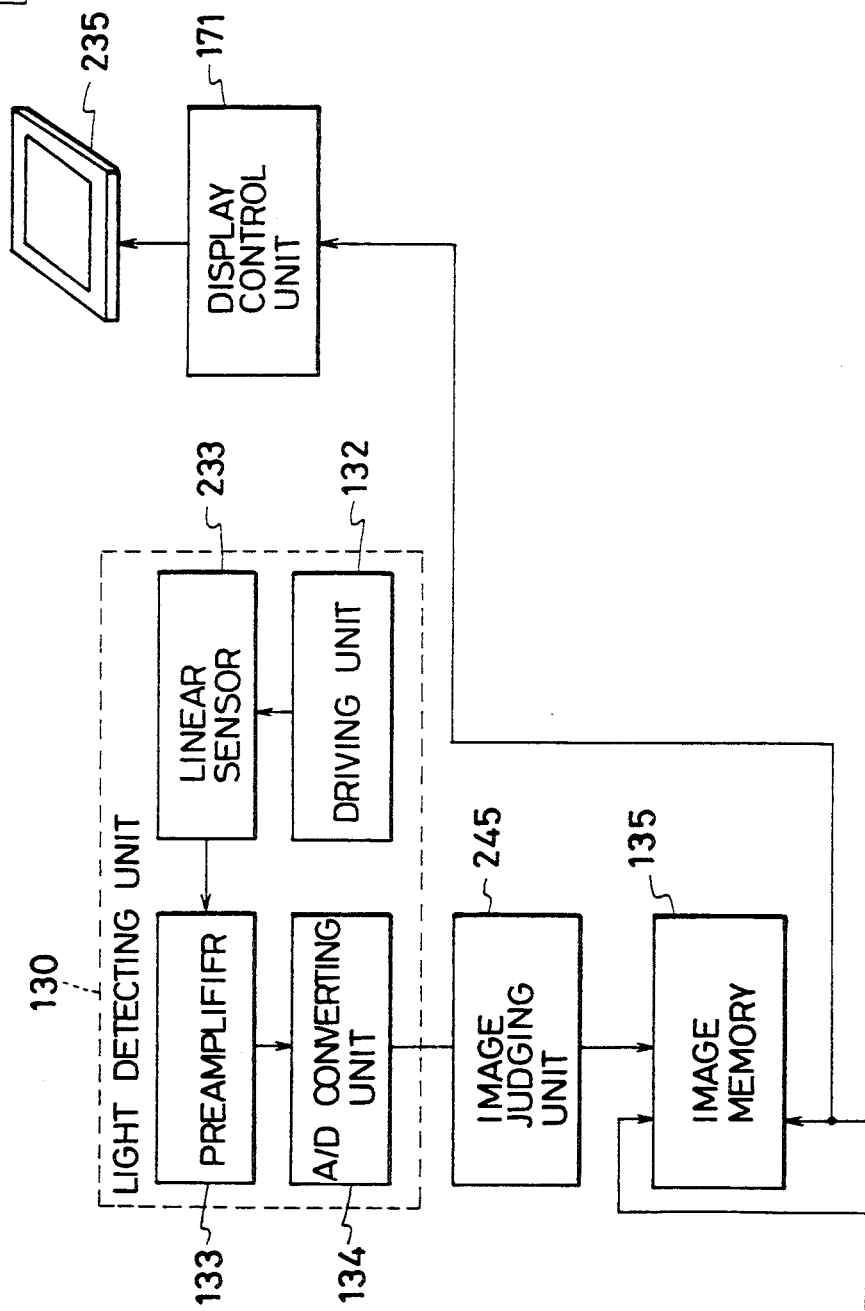

SIMPLE ELECTRONIC FILE SYSTEM

TECHNICAL FIELD

This invention relates to a simple electronic file system for storing documents readily in optical disks.

BACKGROUND ART

Recently, copying machines are at hand in every office, and necessary documents can be readily copied. Resultantly, offices are full of large volumes of copies, which causes troubles, In order to solve the troubles. efficient storage of the copies is sought. Furthermore, it has come even to the paperless system being proposed so as to expel papers out of offices. On the other hand, volumes of information are on steady increase. Access to large volumes of information is necessary for business.

Thus it is contradictorily required that large volumes of information are necessary for business, while increases of their documents must be avoided as much as possible for office environments.

One of the means for storing documents in optical disks is the electronic file system. The storage of documents in optical disks by the electronic file system can contribute to space savings.

But the conventional electronic file system requires a considerably cumbersome electronic file unit, and requires complicated registration/retrieval keys for storing documents, and full time operators. When a document stored in an optical disk is required, an input is made by keys in accordance with a complicated registration/retrieval key system to read the document, which needs full time operator' assistance.

SUMMARY OF THE INVENTION

An object of this invention is to provide a simple electronic file system which can record/store documents without using complicated registration/retrieval keys, and reproduce readily the stored documents.

The simple electronic file system according to this invention comprises a copying machine with an optical disk device including a light detecting unit for converting an optical image of a document into digital image information, an image storing unit for storing the digital image information converted from the optical image by the light detecting unit, a printer unit for printing the digital image information on a paper, an optical disk unit for recording the digital image information recorded in the optical disk contained in a replaceable (portable) optical disk cartridge, and a selection unit for selecting whether the digital image information is printed by the printer unit or not, and whether the digital image information is recorded by the optical disk unit or not; and a reproduction only optical disk including a selection unit for selecting one of the pages recorded in the optical disk in the optical cartridge to be reproduced, an optical disk unit for reading from the optical disk the digital image information of the page selected by the seelection unit, an image storing unit for storing the digital image information read by the optical disk, and a flat display unit for displaying the digital image information stored in the image storing unit.

This invention, which has the above-described structure, makes it possible to record image information of a document in an optical disk in units of pages by the copying machine with an optical disk device and reproduce in units as pages the image information recorded in the optical disk by the reproduction only optical disk device.

BRIEF DESCRIPTION OF THE DRAWINGS

FIG. 6 including FIGS. 6A, 6B are block diagrams of the copying machine with an optical disk device of FIG. 5;

FIG. 8 including FIGS. 8A, 8B are block diagrams of a second example of the copying machine with an optical disk device used in the simple electronic file system of FIG. 1;

FIG. 9 including FIGS. 9A, 9B are block diagrams of a third example of the copying machine with an optical device used in the simple electronic file system of FIG. 1;

FIG. 11 including FIGS. 11A, 11B are block diagrams of the copying machine with an optical disk device of FIG. 10;

BEST MODE FOR CARRYING OUT THE INVENTION

1. A First Embodiment

The electronic file system according to a first embodiment of this invention will be explained with reference to the drawings.

Figure 1:
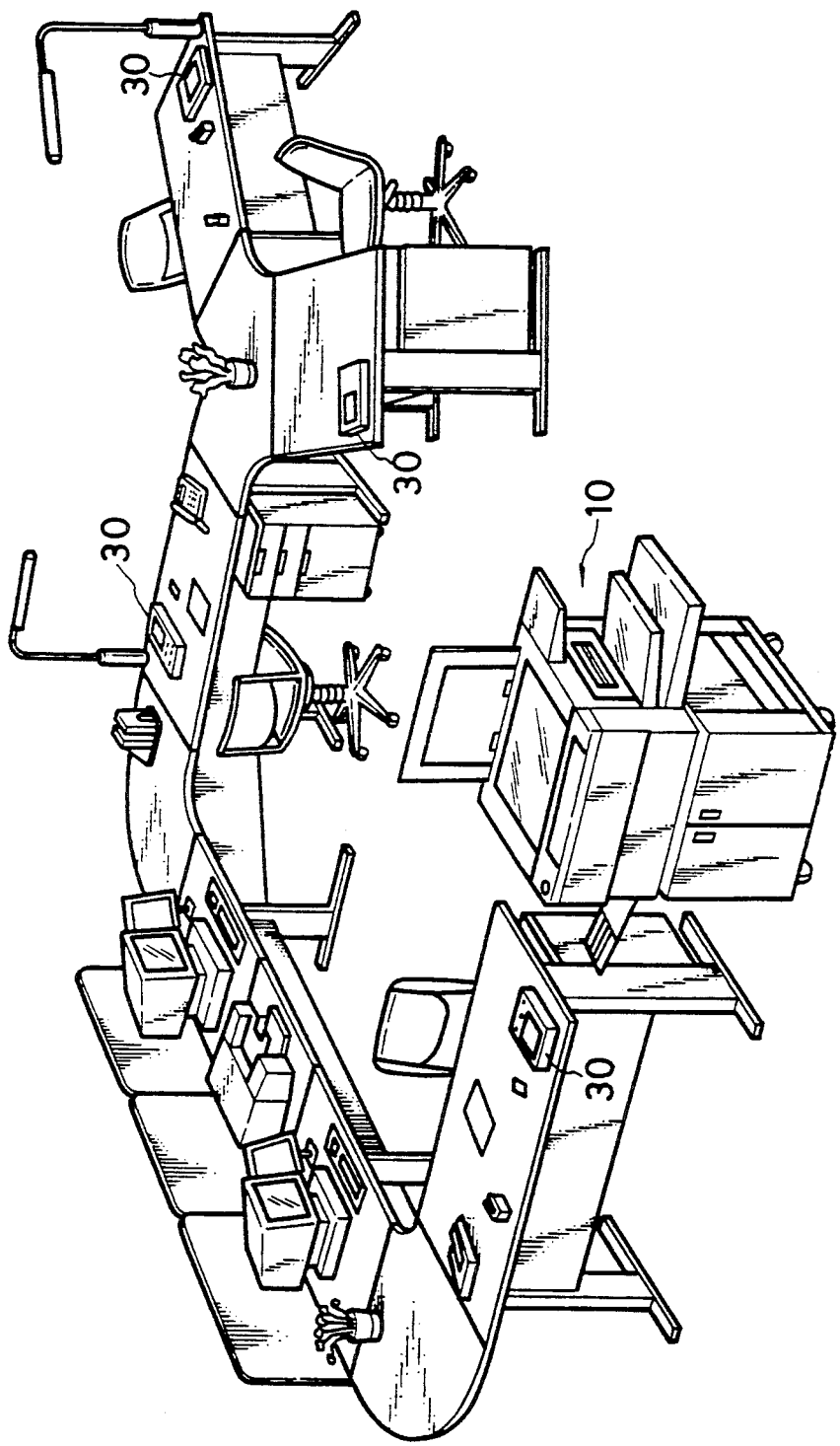
FIG. 1 is a view of an example of the simple electronic file system according to a first embodiment of this invention, which is used in an office.

1.1 Summary of the Simple Electronic File System 1.1 Summary of the Simple Electronic File System FIG. 1 shows an example of the layout of the simple electronic file system suitably used in an office.

The electronic file system of the office includes one copying machine with an optical disk device having an optical disk device for recording a document in an optical disk and erasing the optical disk, and a plurality of reproduction only optical disk devices 30 for reproducing the document recorded in the optical disk. The copying machine with an optical disk device 10 is used commonly by all the office members. Respective office members operate the copying machine with an optical device 10 when they wish to record a document. The structure of the copying machine with an optical device 10 will be explained below in detail. The copying machine with an optical device 10 can be operated in the same way as a document is copied, so as to record a document in an optical disk.

The reproduction only optical devices 30 are placed on the desks of the respective office members. They can operate their own devices 30 to see the contents of the documents recorded in optical disks in the same way as they look at usual files. If extra ones of the reproduction only optical devices 30 are placed in office members' houses, they will be able to do their jobs at home simply by taking the optical disks home.

Figure 2:
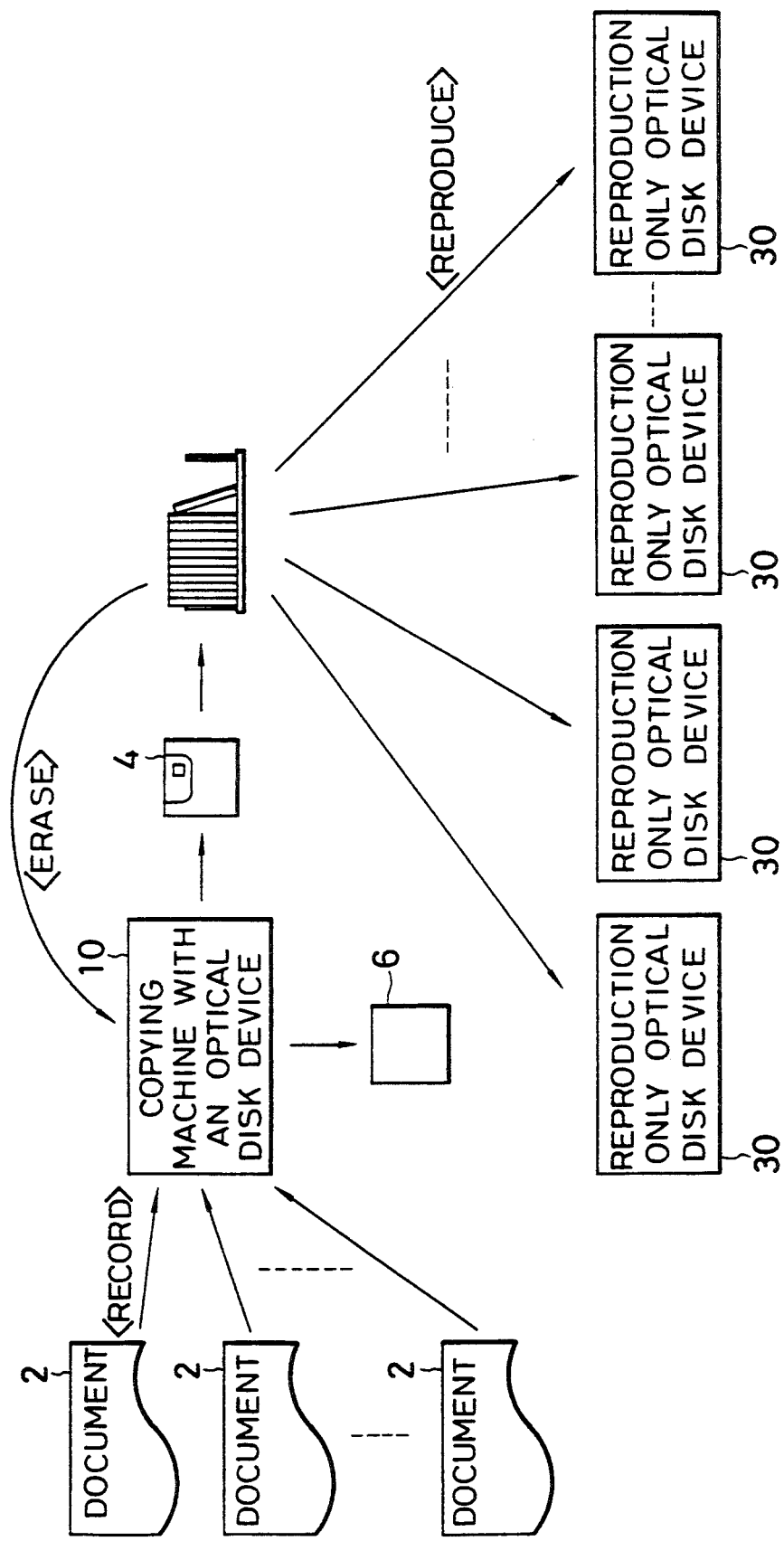
FIG. 2 is a flow chart of recording, storage, reproduction and erasion of the simple electronic file system of FIG. 1.

The flow of recording, storing, reproducing and erasing a document by the simple electronic file system according to this embodiment will be explained with reference to FIG. 2.

A characteristic of the simple electronic file system according to this embodiment is that a document is exchanged off-line, using a compact optical disk.

A document 2 to be recorded is recorded in an optical disk 5 by the copying machine with an optical device 10. At this time a hard copy 6 may be produced as required. An optical disk cartridge 4 containing an optical disk 5 with the document recorded in it is kept on a desk or shelf in the usual way. Thus the optical disk takes much less space than paper copies and is free from worries about storage spaces. The optical disk 5 which has a capacity equivalent to about 1000–2000 A4 sheets is equal to the volume of one usual paper file. One optical disk cartridge 4 can be used as one file.

The retrieving process involved in the simple electronic file system according to this embodiment will be explained with reference to FIGS. 2 and 4.

Figure 3:
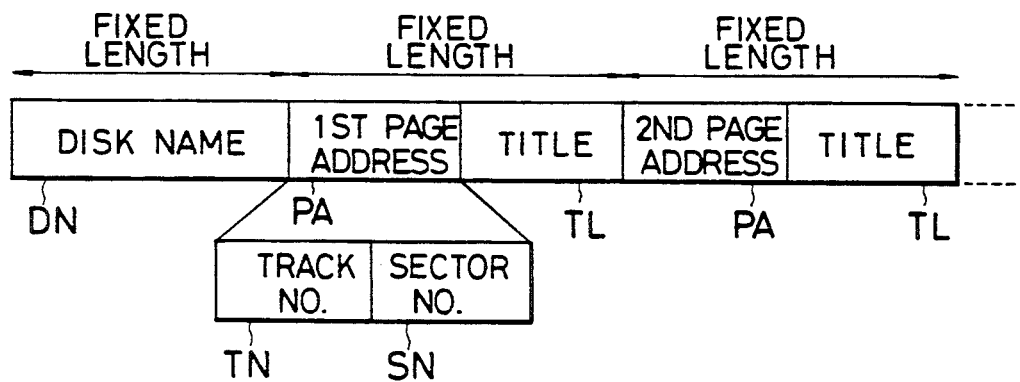
FIGS. 3 and 4 are explanatory views of the retrieval of the simple electronic file system of FIG. 1.

In the simple electronic file system according to this embodiment, when a document is recorded in an optical disk, the recording takes place in the sequential order of the pages in the unit of page. Management data of FIG. 3 is recorded in a preset region of the optical disk as a management data region. The management data contains the disk name DN indicating the general name of the documents recorded in the optical disk, the page addresses PA where the images of the respective pages are recorded, and the titles TL of the respective pages. Each page address PA contains a track number TN and a sector number SN where the associated image is recorded. The disk name DN and the title TL are inputted by an operator when a document is recorded in the optical disk, but they do not have to be essentially recorded, because they are for the operator's memoranda to be used when he reproduces the document. If the title TL is recorded, it is recorded in a title column on the first page of plural pages of the document. The page addresses PA are automatically recorded by the copying machine with an optical disk device 10 when the document is recorded. It is possible that the management data contains a data and time when the document is recorded.

Figure 4:
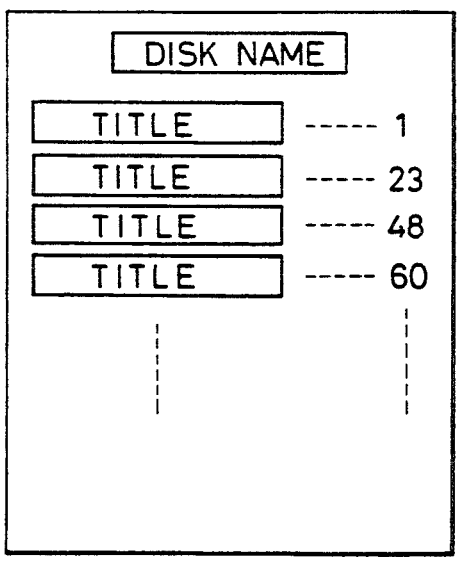

When the optical disk with the management data as shown in FIG. 3 recorded in it is reproduced, first the management data is read, and as shown in FIG. 4, "the disk name", "titles" and "page numbers" are displayed. That is, the disk name is displayed at the upper portion of the displayed image, and below the disk name are sequentially displayed the "title" and "page numbers" as in contents of ordinary books. Looking at this display, the operator designates a necessary page number on the display and reproduces the necessary page.

In the conventional electronic file system, since one optical disk can record a large volume of documents, complicated registration/retrieval keys are used. In this embodiment, however, as described above. one optical disk has a capacity of about 1000–2000 A4 sheets. This small capacity yields a characteristic of this invention that the data management is based on page numbers, and the titles are used as auxiliary means for the data management.

When a recorded document is erased to record a different document, only the management data region is rewritten without erasing the image data of the recorded document, and the image data of the different document to be recorded is written in addition to the recorded image data. Thus a rewrite of a document can be optical in a short period of time.

1.2 Copying Machine with an Optical Disk Device

Figures 5, 7:
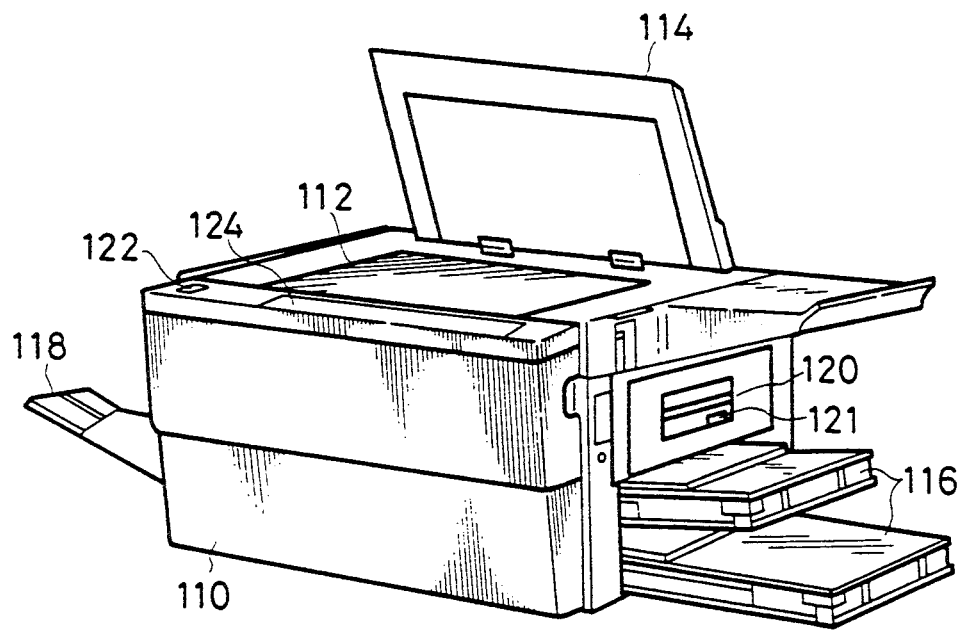
FIG. 5 is a perspective view of a first example of the copying machine with an optical disk device in the simple electronic file system of FIG. 1.
FIG. 7 is a plane view of data input keys for the copying machine with an optical disk of FIG. 5.

FIGS. 5–7 show a first example of the copying machine with an optical disk device used in the simple electronic file system according to this embodiment. The copying machine with an optical disk device according to this example comprises the so-called digital copying machine for converting an image signal into a digital signal, and an optical disk device.

As shown in FIG. 5, the optical disk device according to this example comprises, as an ordinary digital copying machine does, a body 110, an original table 112 provided on the body 110 for mounting an original to be copied, and an original cover 114 for pressing the original on the original table 112. Cassettes 116 containing copy papers are loaded in the right side of the body 110, and on the left side of the body 110 is provided a copy receiving tray 118 for receiving copies.

In the right side of the body 110 above the cassettes 116 there is provided a cartridge receiving opening 120 at which an optical disk cartridge 4 is loaded in the body 110. A push button 121 is pushed to eject the loaded cartridge 4.

On the foreground of the original table 112, on the top surface of the body 110, there are provided a power switch 122 and a menu panel 124 for selecting the operations of an ordinary copying machine and those of an ordinary optical disk.

Figure 6B:
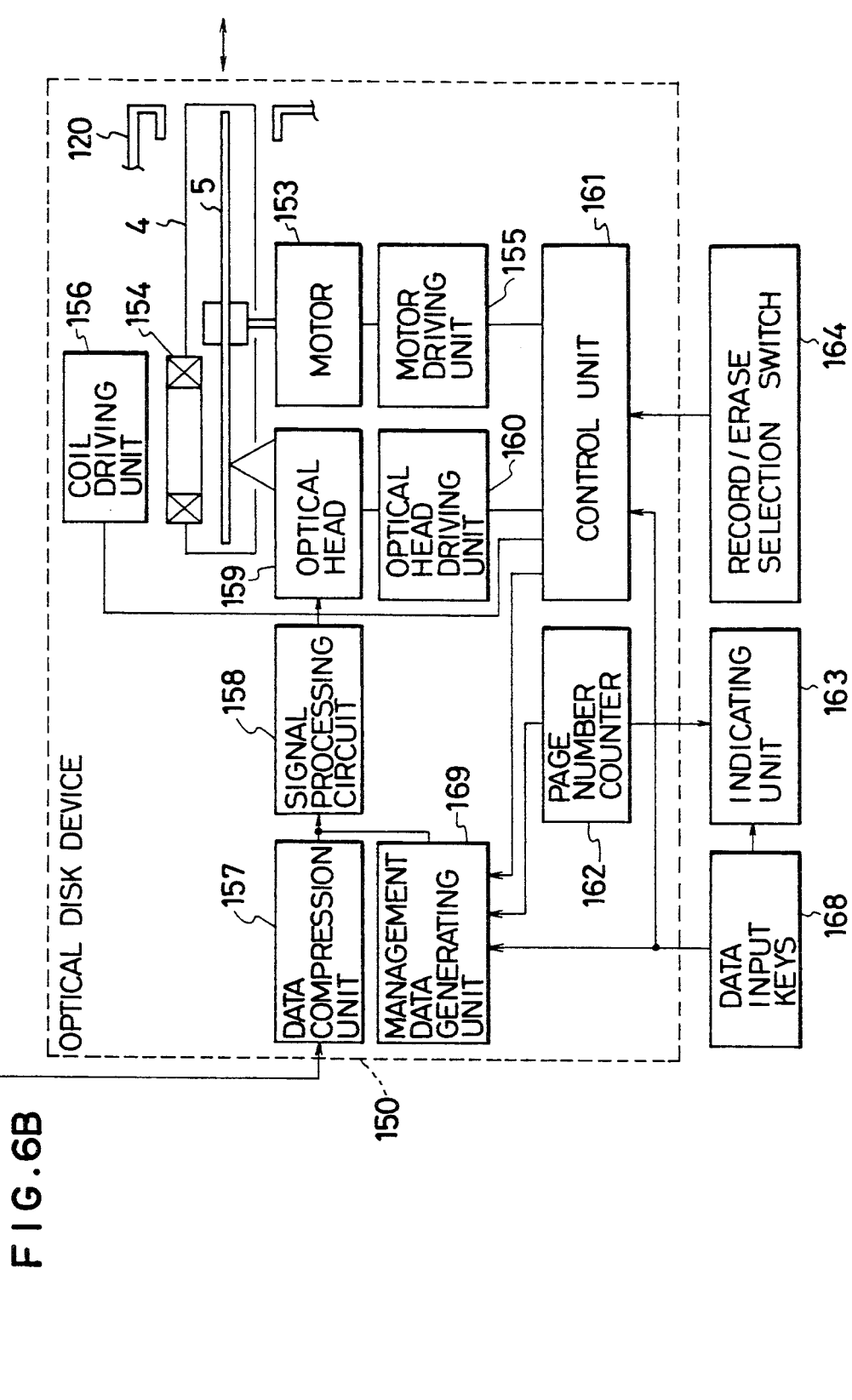

The copying machine with an optical disk device according to this example will be explained in more detail with reference to FIG. 6, 6A, 6B.

A light detecting unit 130 converts the image of a document 2 to be copied on the original table 112 into digital image information. A linear sensor 131 reads the image of the document 2 and is moved operatively over the entire surface of the document 2. A preamplifier 133 amplifies an image signal from the linear sensor 131. The amplified analog image signal is converted into a digital image signal.

The digital image information of the document 2 converted by the light detection unit 130 is stored in an image memory 135. A selection unit 136 selects whether the digital image information stored in the image memory 135 is printed (1) on a copy paper, (2) on an optical disk or (3) both on a copy paper and an optical disk.

This selection is executed by the paper/disk selecting switch 137 on the menu panel 124.

A laser printer unit 140 prints the digital image information on a copy paper. A laser scanning unit 141 causes a laser beam to scan with varied intensities a photosensitive drum 142 on rotation so as to form on the photosensitive drum 142 a shade image corresponding to the digital image information outputted by the selection unit 136. The shade image formed on the photosensitive drum 142 is transferred onto a paper. The printed paper are discharged onto the copy receiving tray 118.

The optical disk device 150 records the digital image information in the optical disk 5. The optical disk 5 is contained in the cartridge 4. When the cartridge 4 is loaded through the cartridge receiving opening 120, the optical disk 5 is mounted on a motor 153, concurrently with the magnetic field generating coil 154 coming down to a set position of the cartridge 4.

A motor driving unit 155 drives and controls a motor 153 to rotate the optical disk 5 at a required rotation number. A coil driving unit 156 drives a magnetic field generating coil 154 to generate a required magnetic field.

The digital image information outputted by the selection unit 136 to the optical disk device 150 is data-compressed by a data compression unit 157 for recording. The data compression is conducted by, e.g., modified READ (modified relative element address designate), an international facsimile standard. The modified READ is detailed in Reference: R. Hunter, A. H. Robinson: International digital facsimile coding standards, Proc. IEEE, vol. 68, No. 7, pp. 854–867 (July, 1980).

The data-compressed image information is processed, e.g. amplified, by the signal processing circuit 158 for recording in the optical disk 5. The signal-processed image information is recorded in the optical disk by the optical head 159. The optical head 159 is driven and controlled to select a track and drive without a focusing error, tracking error, etc., and the image data is recorded in the optical head 5.

A control unit 161 controls the motor driving unit 155, the coil driving unit 156 and the optical head driving unit 160 so that the image information is recorded at a required track of the optical disk. In this embodiment, image information is written in the optical disk in units of pages, and the first image of each document to be copied is recorded as Page 1 followed by the successive pages. In other words, this embodiment is free from complicated code inputs required by the conventional image file and records images simply in sequential order.

But, at this time, if necessary, the abovedescribed management data can be inputted in the management data region of the optical disk by data input keys 168. That is, when a fresh optical disk is used, a disk name DN is inputted, and a title TL is inputted every time a document is recorded. The contents inputted by the data input keys 168 are displayed by the display unit 163, so that the operator can input data, checking the contents.

One example of the data input keys 168 is shown in FIG. 7. This example is a simplified one with a smaller number of keys. Data keys are located at the central portion of the data input keys 168. The data keys include English letter keys from A to Z, and a space key. A part of the English letter keys can be shifted to figure keys from 0 to 9 and mark keys, such as "−", ".", ",", "/", "*", "#", etc. On the left side of the data input keys 168 there are located control keys, such as an English letter/Kana (one Japanese script)/figure shift key, a C (one letter clear) key, an AC (all letters clear) key. On the right side of the data input keys 168 are located a left scroll key, a right scroll key, a non-transform key (for transforming Hiragana's to Chinese letters), a transform/next-transform key, and a SET key.

The English letter/Kana/figure shift key selects one key input mode out of English letter input mode, Kana input via Romanized Japanese letter mode and figure input mode. this English letter/Kana/figure shift key has successfully saved a number of keys.

The C (one letter clear) key is for correcting an inputted letter. A last inputted letter is deleted by one.

The AC (all letters clear) key deletes all the inputted letters. After the deletion, an operator resumes an input operation from the start.

The left and the right scroll keys are for scrolling the display of an inputted disk name and titles right and left.

The non-transform and the transform/next transform keys control the Hiragana (one Japanese script)—Chinese letter transform in inputting Kana input via Romanized Japanese letters.

The SET key is for registering inputted letter lines.

By operating this data input keys 168, an operator can not only input English letters, figures and marks, and Hiragana and Kana via Romanized Japanese letters, but also input Chinese letters by transforming Hiragana and Kana inputted via Romanized Japanese letters to Chinese letters.

The control unit 161 has a page number counter 162 for indicating what the ordinal number of page of the optical disk image information currently being recorded is. This page number counter 162 counts up every time image information is recorded in the optical disk 5. A content of the page number counter 162 is shown by an indicator 163 of the operation panel 124.

A management data generating unit 169 generates management data in the format of FIG. 3, based on input contents from the data input keys 168, page addresses PA from the control unit 161, and a page number from the page number counter 162. This management data is processed by the signal processing circuit 158 to be recorded in the management data region of the optical disk 5.

When the cartridge is loaded, the management data written in the preset management data region of the optical disk 5 is read, and a last page number read from the management data is stored in the page number counter 162. But when the optical disk 5 has no more empty area, the indicator 163 indicates such.

The optical disk device 150 according to this example can record image information in the optical disk 5 and erase the recorded image information to initialize the optical disk. This recording and erasion are selected by operating the record/erase selecting switch 164 on the operation panel 124.

The operation of this example will be explained below.

Operation of Paper Copy Mode

When the paper copy mode for reproduction on a paper is selected by the paper-disk selecting switch 137, the selection unit 136 does not output the digital image information to the optical disk device 150 but to the laser printer unit 140. The document 2 to be copied is placed on the original table 112, and the copy switch (not shown) is pushed. Then the image information is reproduced on a paper by the laser printer unit 140 as does an ordinary copying machine.

Operation of Disk Memory Mode

When the disk record mode for recording image information in the optical disk is selected by the paper/-disk selection switch 137, and besides the record mode is selected by the record/erase selection switch 164, the selection unit 136 does not output the digital image information to the laser printer 140 but to the optical disk device 150.

Before the document 2 to be copied is placed on the original table 112, a cartridge is loaded through the cartridge receiving opening 120. Then the optical disk 5 is mounted on the motor 153, and the optical disk 5 is rotated up to a required rotation number. When the rotation number of the optical disk reaches the required number, the optical head 159 reads the contents of a control track, and a last page number being currently recorded is counted by the page number counter 162.

When a document 2 to be copied is placed on the original table 112, the indicator 163 makes an indication that the operator input the title TL of the document. The operator inputs the title TL as required by using the data input keys 168. After the title has been inputted, a copy switch is (not shown) pushed. Then the image information is read by the light detecting unit to be converted into digital image information. The digital image information is stored in the image memory 135. The selection unit 130 outputs the digital image information only to the optical disk device 150 as described above. This digital image information is data-compressed by the data compression unit 157 and is further signal-processed by the signal processing circuit 158 to be outputted to the optical head 159.

The control unit 161 instructs to the head driving unit 160 a track and a sector next to the one where a last page is recorded. Based on this instruction, the optical head 159 moves the optical head 159 so as to be positioned on the track where the image information is to be recorded, while recording a title TL and a page address at a required position of the management data region. When this recording is completed, the control unit 161 adds 1 to the page number counter 162 to be ready for a next recording.

Operation of Paper Copy/Disk Record Mode

When the paper copy/disk record mode for reproducing image data on a paper and recording the same in the optical disk is selected by the paper/disk selecting switch 137, the selection unit 136 outputs the digital image information both to the laser printer 140 and to the optical disk device 150.

In this mode, the operations of the above-described paper copy mode and the above-described disk recording mode take place simultaneously.

Operation of Disk Initialization Mode

When the disk record mode for recording image information in the optical disk is selected by the paper/-disk selecting switch 137, and besides the erasion mode is selected by the record/erase selecting switch 164, the control unit 161 controls the coil driving unit 156 and the optical head driving unit 160 so as to initialize the optical disk 5. In the initialization, erasion is conducted sequentially on all the tracks one by one. It is possible that the indicator unit 163 indicates an initialization is on. Information (e.g., "0") indicating no information is recorded in control tracks of the optical disk 5.

Since this copying machine with an optical disk device enables the contents of a document to be recorded readily in an optical disk in the same way as does an ordinary copying machine, it is suitable to be used as a topical disk recording device in the simple electronic file system. Since a document can be not only copied but also recorded in an optical disk, although filing is necessary, information which is not presently necessary is stored in an optical disk, consequently with a result that information can be accumulated without papers flooding offices. Since the copying machine with an optical disk device according to this example can record and erase information, optical disks which store unnecessary information can be initialized to economically be used as fresh ones.

1.3 Copying Machine with an Optical Disk Device (a Second Example)

Figure 8B:
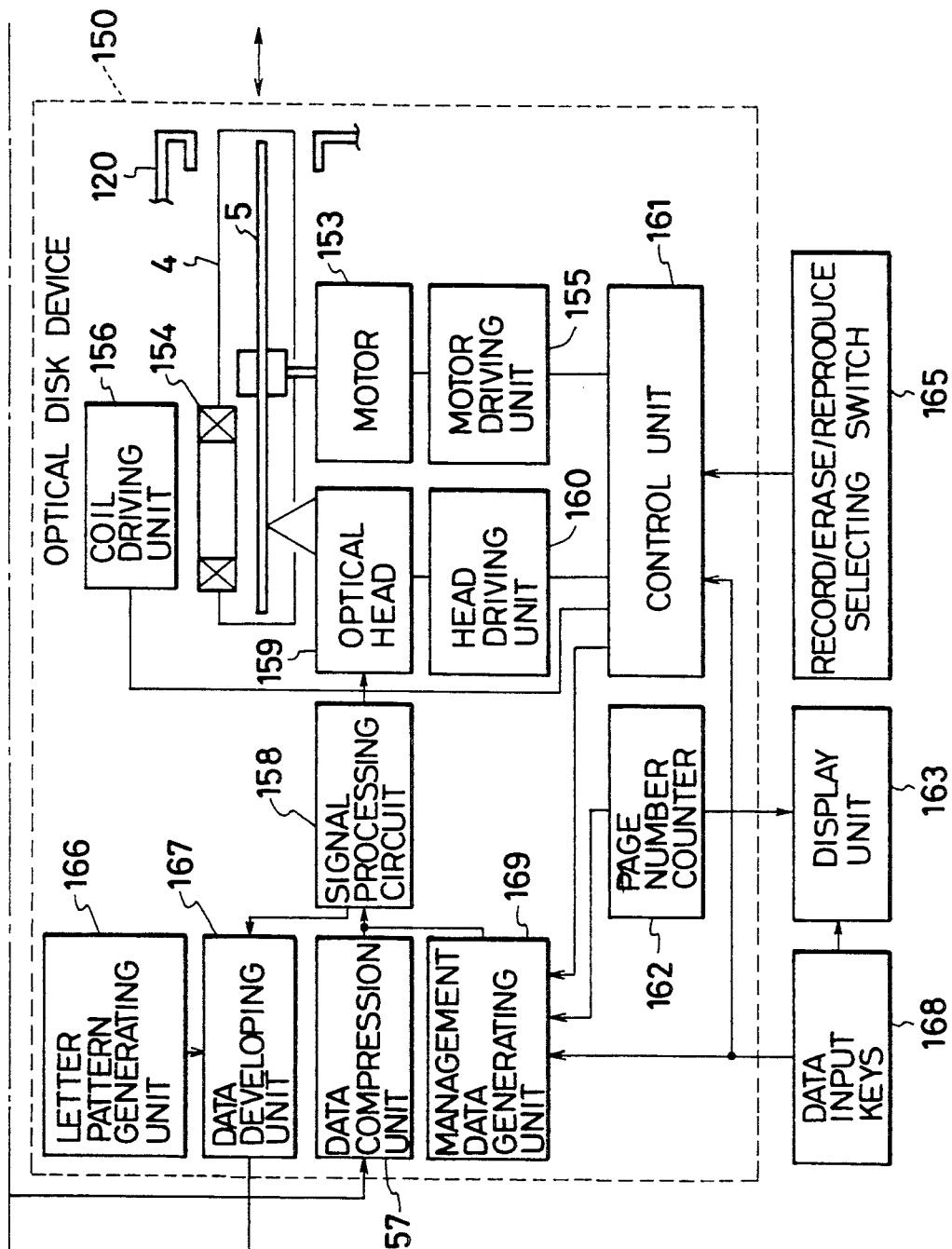

FIGS. 8, 8A, and 8B show a second example of the copying machine with an optical disk device. The constituent members of FIGS. 5–7 common with the first example have common reference numerals not to repeat their explanations.

This example also comprises a digital copying machine with an optical disk and differs from the first example in that in this example image information recorded in an optical disk is read to be printed on papers.

The optical disk device according to this example can record image information in an optical disk and erase, and also can reproduce the image information. Recording, erasion and reproduction are selected by a record-/erase/reproduce selecting switch 165 on an operation panel 124. In a reproduction, the management data of an optical disk 5 is read to be displayed in a display unit 163. A page number to be reproduced is designated by figure keys or a secret key of data input keys 168 on the operation panel 124.

Image information read from the optical disk by an optical head 159 is given a required signal processing by a signal processing circuit 158. Then the image signal is data-developed by a data-developing unit 167 to be stored in an image memory 135. The image information stored in the image memory 135 is printed on papers by a laser printing unit 140.

This example further includes a flat display 170. This flat display 170 is for displaying the image information stored in the image memory 135. The flat display 170 is connected to the image memory 135 through an image display 171 and every image information stored in the image memory 135 is displayed. It is possible to dispose a switch on the flat display 170 for selecting whether or not the image information stored in the image memory 135 is displayed.

The flat display 170 may be disposed at any position of the copying machine with an optical disk device, e.g., on an original cover 114, a side of a body 110 or operation panel 124.

The flat display 170 may be any means, such as a liquid crystal display panel, an EL display panel, a plasma display panel or others.

In printing management data on papers by a laser printer unit 140 or in dislaying the management data on the flat display 170, the management data, which is recorded in letter codes, is read to be converted into image information by a data developing unit 167, using letter patterns from a letter pattern generating unit 166, and stored in the image memory 135.

In this copying machine with an optical disk device, since the contents of the image memory 135 can be displayed on the flat display 170, the image from the light detecting unit 130 is checked beforehand on the flat display 170 to thereby avoid recording of a poor input image. In reproducing the optical disk 5, it is also possible to avoid wasteful hard copies by checking the reproduced image before printing the same on papers.

1.4 Copying Machine with Optical Disk Device (a Third Example)

Figure 9B:
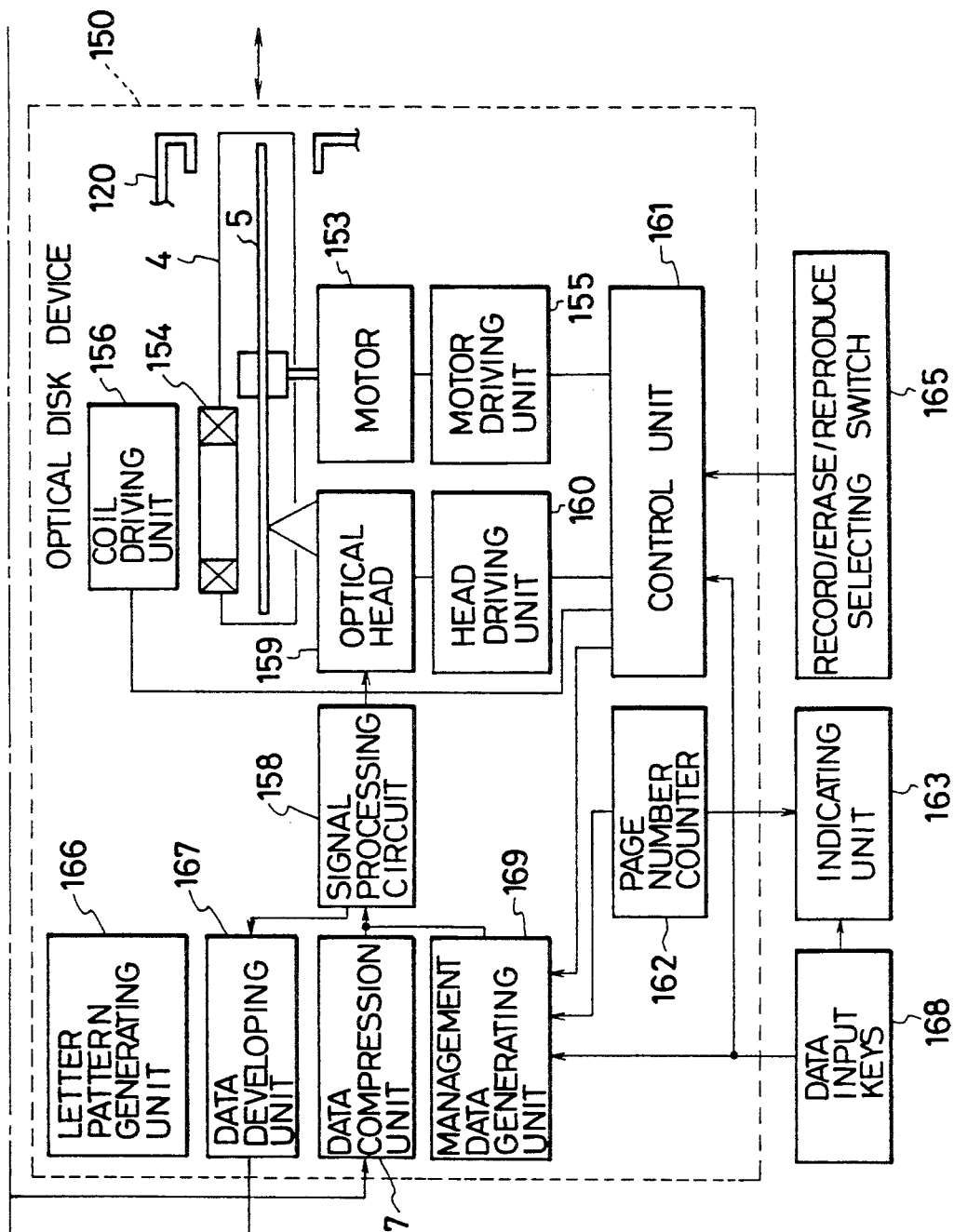

FIGS. 9, 9A, and 9B show a third example of the copying machine with an optical disk device. The constituent members common with the first and the second examples have common reference numerals not to repeat their explanations.

In this example, an image of a document to be copied is projected directly on a photosensitive drum. This example comprises the so-called analog copying machine, and an optical disk device.

The copying machine with an optical device according to this example is basically an analog copying machine. A document 2 to be copied on an original table 112 is copied by a copying unit 180. The document 2 is irradiated by a light source 181. Its reflected image forms on the surface of a photosensitive drum 187 through an optical system comprising mirrors 182, 183, 184, 186, 185. That is, the reflected light on the document 2 is reflected by the mirror 182 moved together with the light source 181 to have the optical path bent by the mirrors 183, 184 to be led to the mirror 185. The reflected image converged by the lens 185 is led by the mirror 186 to the photosensitive drum 187. A shade image is formed in accordance with the reflected image on the photosensitive drum 142, and this shade image is transferred onto papers by the usual method. The papers with the shade image transferred thereto are conveyed by a conveyor belt 188 to be fixed in a fixing unit 189 to be discharged onto a copy receiving tray 118.

In this example, the mirror 186 comprises a half mirror so as to allow part of the reflected image to pass and be detected by a linear sensor 131 of a light detecting unit 130. A characteristic of this example is that the linear sensor 131 is inserted in the optical path of the analog copying unit 180. The image detected by the light detecting unit 130 is stored in an image memory 135.

A selection unit 136 is connected to a shutter 195 through a shutter driving unit 196. The shutter 195 is disposed between the half mirror 186 and the photosensitive drum 187 for shielding the reflected image to the photosensitive drum 187 in accordance with whether or not to reproduce the image on papers. The shutter 187 may be an electrically closable shutter, such as liquid crystal or the like, or a mechanically closable shutter. Instead of disposing the shutter for shielding the reflected light, an optical image is formed on the photosensitive drum but is not reproduced on papers.

The operation of this example will be explained below.

Operation of Paper Copy Mode

When a paper copy mode for reproduction an image on papers is selected by a paper/disk selecting switch 137, the selection unit 136 opens the shutter 195 so as to pass the image light, while supplying an instruction to reproduce the image to the control unit (not shown) of the copying unit 180. A document 2 to be copied is placed on the original table 112, and then a copy switch (not shown) is pushed. Then the image is reproduced on a paper as is in an ordinary copying machine.

Operation of Disk Record Mode

When a disk record mode for recording an image on an optical disk is selected by a paper/disk selecting switch 137, and besides record mode is selected by a record/erase/reproduce selecting switch 165, the selection unit 136 outputs digital image information to the optical disk device 150. At the same time, the selection unit 136 closes the shutter 195 so as not to form the image on the photosensitive drum 187, while it does not output an instruction to reproduce the image to the control unit (not shown) of the copying unit 180.

The recording on an optical disk is the same as in the first and the second examples, and its explanation is omitted.

Operation of Paper Copy/Disk Record Mode

When paper copy/disk record mode for reproducing an image on a paper and recording the image on an optical disk is selected by the paper/disk selecting switch 137, the selection unit 136 opens the shutter 195, while outputting digital image information to the optical disk device 150.

In this mode, the above-described paper copy mode and the disk record mode are simultaneously performed.

Thus, the copying machine according to this example, which is an analog copying machine, can record image information on an optical disk as does a digital copying machine.

1.5 Copying Machine with an Optical Disk Device (a Fourth Example)

FIGS. 10, 11, 11A, and 11B show a fourth example of the copying machine with an optical disk device.

The copying machine with an optical disk device according to a fourth example comprises a copying machine 210, and an optical disk device 230 attached to a side of the copying machine 210.

According to this example, the optical disk device 230 is attached to the analog copying machine 210, but the copying machine 210 may be an analog or a digital one as long as it is usually used.

An original table 212 for a document to be placed on is disposed on the top of this analog copying machine 210. There is provided an original cover 214 for pressing the document.

The document 2 to be copied on the original table 212 is irradiated by a light source 216, and its reflected image is formed on the surface of a photosensitive drum 222 by an optical system comprising mirrors 217, 218, 219, 220, and lens 221. That is, the image light of the document 2 to be copied reflected by the mirror 217 moved together with the light source 216 has the optical path bent by the mirrors 218, 219 to be led to the lens 221. The image light converged by the lens 221 is led by the mirror 220 to the photosensitive drum 222. A shade image is formed on the photosensitive drum in accordance with the image light. This shade image is transferred by the usual method onto a paper taken out of a cassette 223. The paper with the image transferred thereto is conveyed by a conveyor belt 224 to a fixing unit 226 for fixing and are discharged onto a copy receiving tray 228.

The optical disk device 230 is attached to the left side of the copying machine 210. In the left side of the optical disk device 230 there is formed a cartridge receiving opening 231 through which an optical disk cartridge 4 is inserted. A push button (not shown) is pushed to eject the cartridge 4.

A linear sensor 233 for inputting the image of the document 2 is attached to the copying machine 210 immediately above a copy discharge opening 229 through which copies are discharged onto the copy receiving tray 228. This linear sensor 233 reads the image reproduced on a paper, and the read signal is supplied to the optical disk device 230 to be processed as will be described below.

In this example, the linear sensor 233 is attached to the copying machine 210 immediately above the copy discharge opening 229 but it may be disposed anywhere as long as an image reproduced on a paper by the copying machine can be optically detected.

An operation panel 234 for operating the optical disk device 230 is disposed on the top of the optical disk device 230.

The copying machine with an optical disk device according to this example will be explained in more detail with reference to FIG. 11 which is a functional block diagram of this example. Common members with the first to the third examples of FIGS. 6, 8 and 9 have common reference numerals not to repeat their explanations.

An image read by the linear sensor 233, which reads the image reproduced on a discharged paper, is converted into a digital image signal by the light detection unit 130 and outputted to an image judging unit 245.

The image judging unit 245 judges a start of an image signal of a paper, based on a digital image signal converted by the light detecting unit 130. For example, when a digital signal becomes a value above a set value which is indicative of whiteness of a paper, the image judging unit 245 judges a paper has been discharged through the copy discharge opening 229 and causes an image memory 135 to store a digital signal outputted by the light detecting unit 130.

The optical disk unit 230 records the digital image information on an optical disk. The optical disk is contained in a cartridge. When a cartridge 4 is inserted through the cartridge receiving opening 231, the optical disk is rotated by a motor 153, and an optical head 159 records and reproduces data, and a magnetic field generating coil 154 erases data.

Image information read from the optical disk 5 by the optical head 154 is stored in the image memory 246 via a signal processing circuit 158 and a data developing unit 167. The image information is displayed by a flat display 235 which is controlled by a display control unit 171, so that the image information recorded in the optical disk 5 can be reproduced on the flat display 235.

Figure 10:
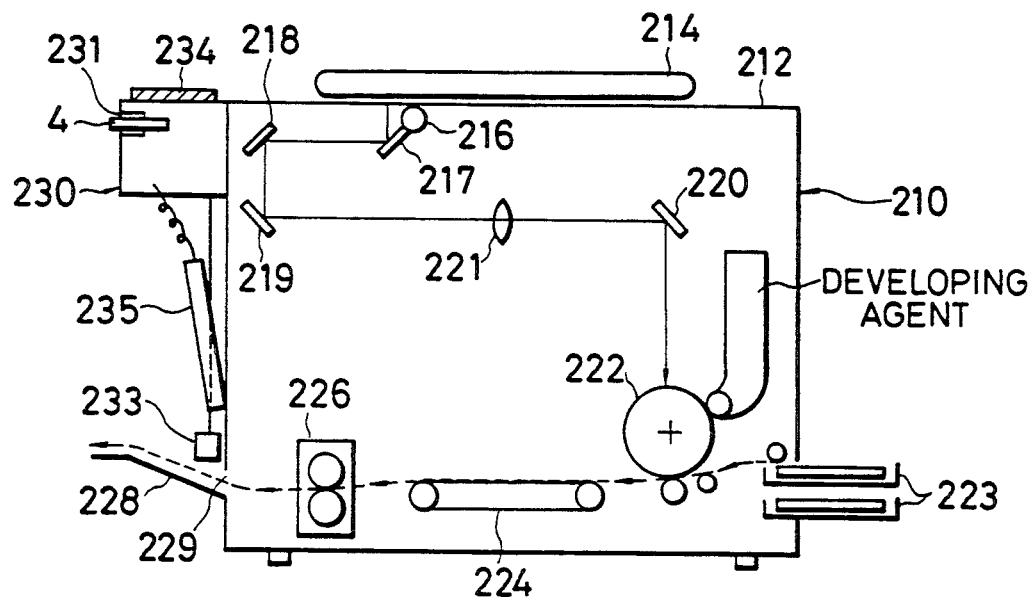
FIG. 10 is a structural view of a fourth example of the copying machine with an optical disk device used in the simple electronic file system of FIG. 1.

In this example, the flat display 235 is disposed below the optical disk device 230 as shown in FIG. 10 but may be disposed anywhere. The flat display 235 may comprise any means, e.g., a liquid crystal panel, EL display panel, plasma display panel or others.

Next the operation of the disk record mode of this example will be explained,

First, a cartridge 4 is inserted through the cartridge receiving opening 231 before a document 2 to be copied is set on the original table 212. Then the optical disk 5 is mounted on a motor 153 and rotated. When the optical disk 5 reaches a set rotation number, contents of a management data region are read, and a last recorded page number is set in a page number counter 162. After the last page number has been set, the optical disk device 23 stands by until a reproduced paper comes out of the copy discharge opening 229.

When a copy switch (not shown) of the copying machine 210 is pushed with the document 2 to be copied placed on the original table 212, the optical image of the document 2 is read and reproduced on a paper. When the paper with the reproduced image is discharged out of the copy discharge opening 229, the image judging unit 245 detects the discharge of the paper, and reads and converts the optical image into digital image information. The digital image information is stored in the image memory 135. This digital image information is outputted to the optical head 159 via the data compression unit 157 and the signal processing circuit 158 to be recorded in a recording region next to the last page number. When the recording is over, the control unit 161 writes the management data of this page number in a management data region while causing the counter 162 to count up by 1, and is ready for a next recording.

1.6 Copying Machine with an Optical Disk Device (a Fifth Example)

Figure 12:
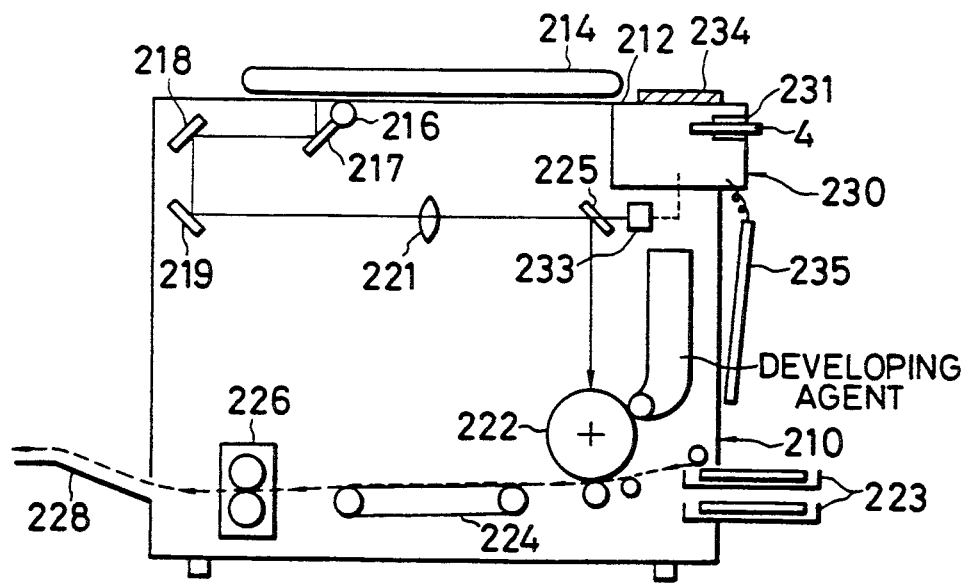
FIG. 12 is a fifth example of the copying machine with an optical disk device used in the simple electronic file system of FIG. 1.
Figure 11B:
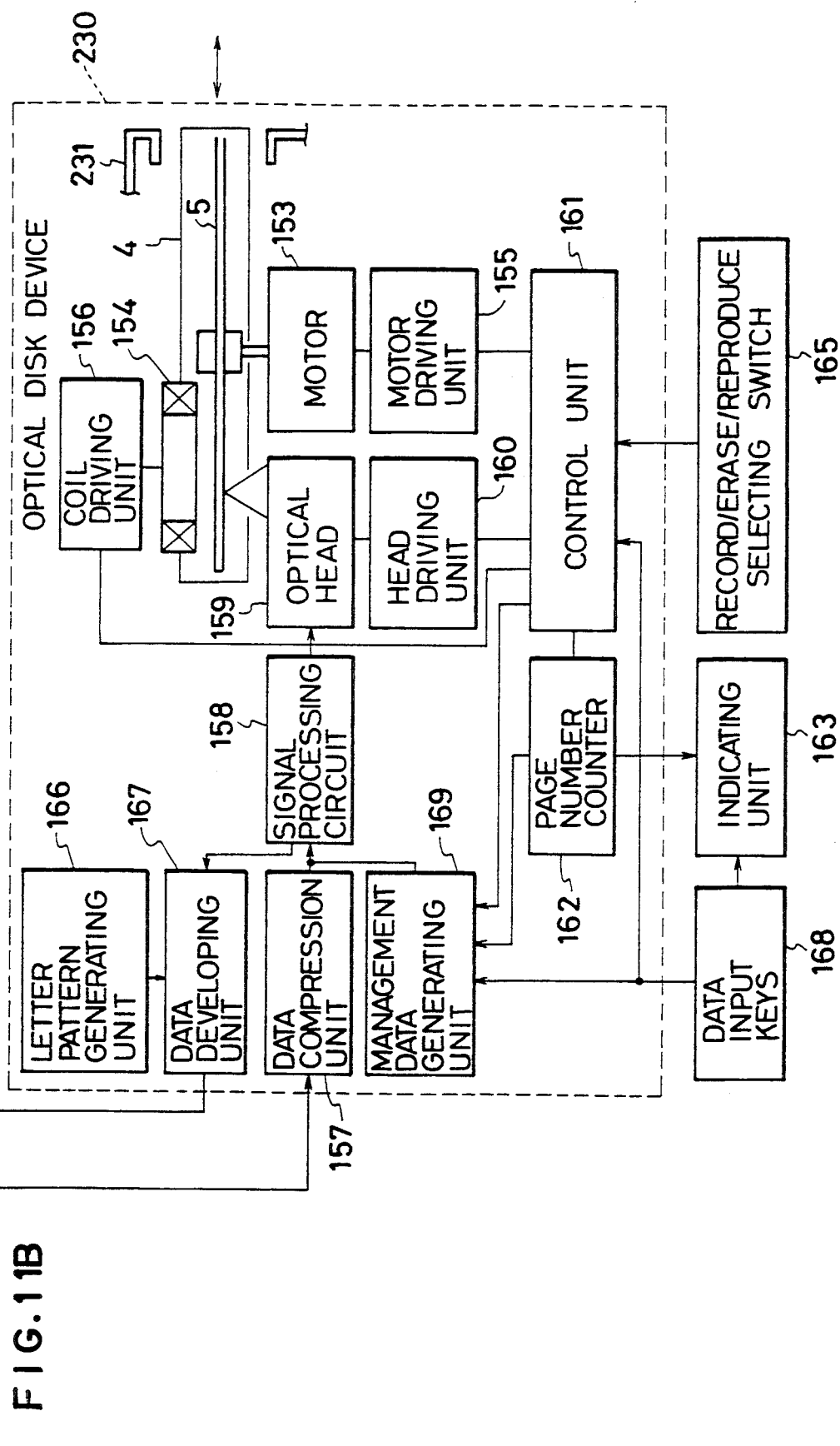

FIG. 12 shows a copying machine with an optical device according to a fifth example of this invention. Common members with the first to the fourth examples have common reference numerals not to repeat their explanations.

In the fourth example the image of a document to be copied is read from a paper with the reproduced image so as to minimize modification of the copying machine 210, while in this example, however, the image of a document to be copied is read from the optical system of the copying machine. This is a difference of the fifth example from the fourth one.

That is, the copying machine 210 is modified so that one 225 of mirrors of an optical system built in the copying machine 210 comprises a half mirror, and a linear sensor 233 is positioned so as to detect lights passing the half mirror 225.

Thus in this example, the linear sensor 233 is attached to the optical system of the copying machine to take out the optical image of a document to be copied. This makes it possible to obtain a clearer image compared with that read from a reproduced paper.

1.7 Reproduction Only Optical Disk Device

Figure 13:
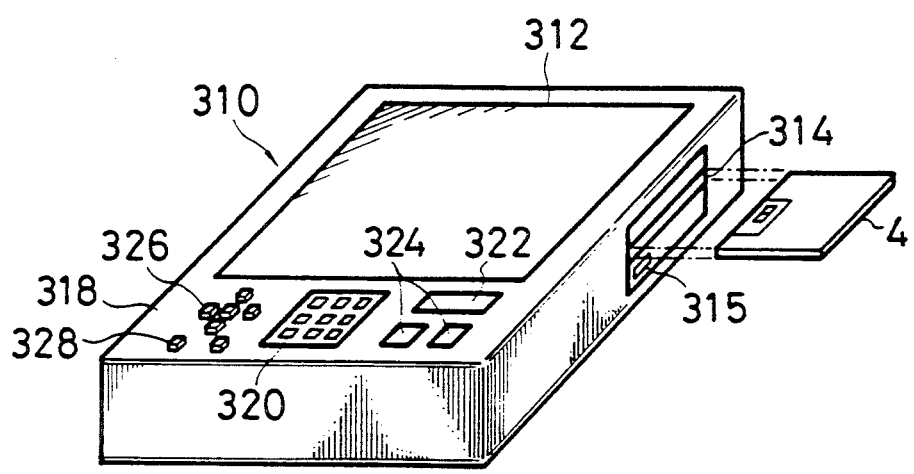
FIG. 13 is a perspective view of an appearance of a reproduction only optical disk device used in the simple electronic file system of FIG. 1.
Figure 14:
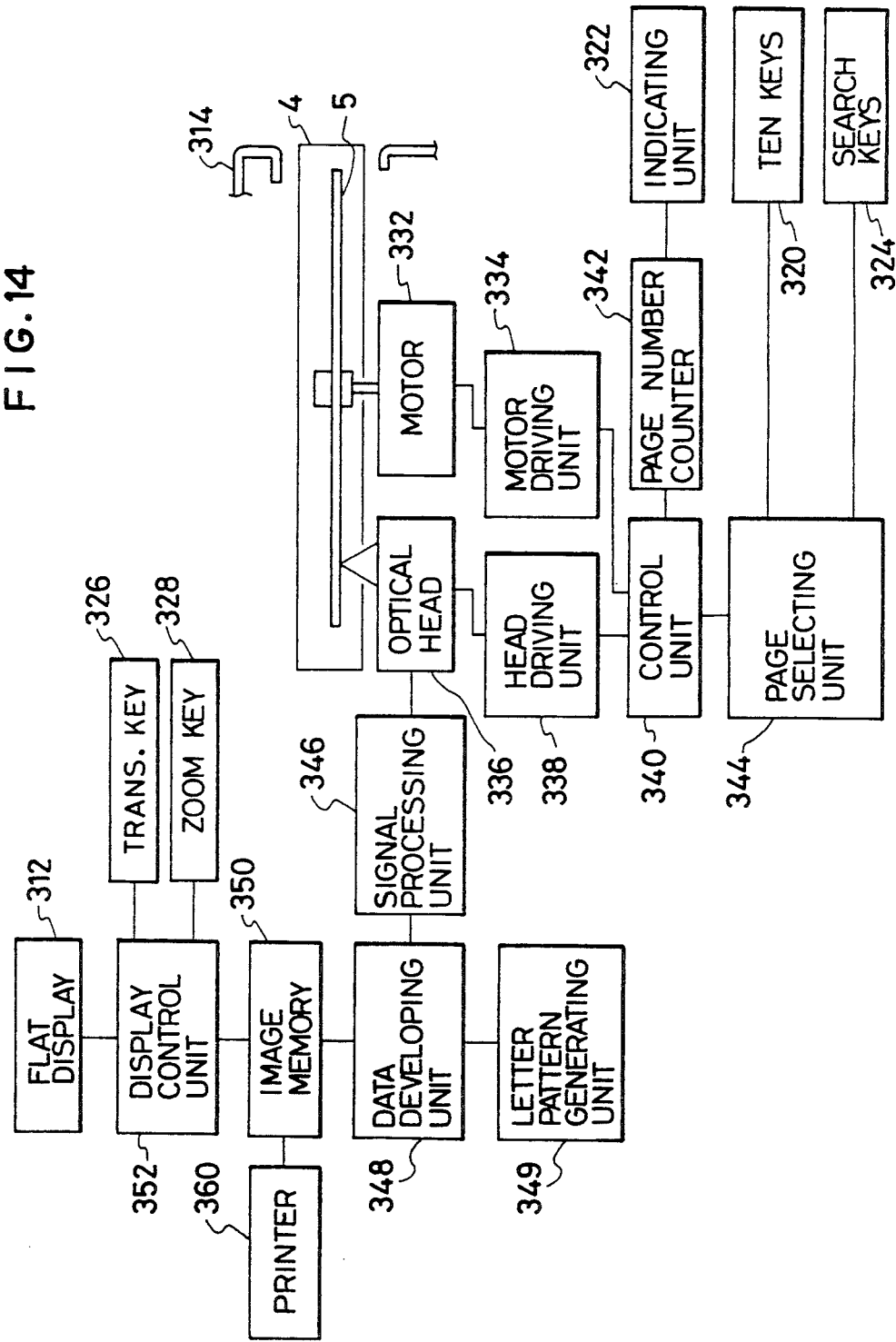
FIG. 14 is a block diagram of the reproduction only optical disk device of FIG. 13.

FIGS. 13 and 14 show an example of the reproduction only optical disk device used in the simple electronic file system according to this embodiment.

As shown in FIG. 13, the reproduction only optical disk device has a flat display 312 for image display disposed on the top of a body 310. The flat display 312 comprises a liquid crystal panel, EL display panel, plasma display panel, etc.

A cartridge receiving opening 314 is formed in the right side of the body 310. An optical disk cartridge 4 is inserted through the cartridge receiving opening 314. A push button 315 is pushed to eject the cartridge 4.

The optical disk used in the simple electric file system according to this embodiment is an erasable rewritable optical disk, but it is preferable to make reproduction only optical disks, such as CD, CD-ROM, LD, etc., and direct read after write optical disks, which make a once recorded document permanent, reproducing so as to increase reproducing software.

An operation panel 318 for operating this reproduction only optical disk device is provided on this side of the flat display 312. At the center of the operation panel 318 there are provided ten keys which are used to designate a page number to be reproduced. A display 322 provided on the right side of the ten keys 320 is used to display the management data of an optical disk, a designated page number, or the page number of a reproduced image. A search key 324 is provided on this side of the display 322. This search key 324 is used to search the page number of a document to be reproduced. A translation key 326 and a zoom key 328 are provided on the left side of the ten keys 320. The reproduction only optical disk device according to this example can enlarge or diminish a part of a reproduced image. The zoom key 328 is used to change a magnification for enlarging or diminishing an image. The translation key 326 is used to designate the position of a part to be enlarged or diminished.

The reproduction only optical disk according to this example will be explained in detail with reference to FIG. 14.

An optical disk 5 is contained in a cartridge 4. The cartridge 4 is inserted through the cartridge receiving opening 314. Then the optical disk 5 is mounted on the motor 332. A motor driving unit 334 controls and drives the motor 332 to rotate the optical disk at a set rotation number.

Image information recorded in the optical disk 5 is read by an optical head 336. The optical head 336 is driven by a head driving unit 338 to select a track, and is controlled to read the image information with no focussing error, tracking error, etc.

A control unit 340 controls the motor driving unit 334 and the head driving unit 338 so that the image information on a required track of the optical disk 5. The image information of the optical disk 5 to be reproduced is processed in units of pages.

A page number counter 324 is provided in the control unit 340 for indicating an ordinal number of a page the image information on which is currently being reproduced. The page number counter 342 stores the page number currently being reproduced. Contents of the page number counter 342 are displayed on the display 322 of the operation panel 318.

A page number to be reproduced is designated by the ten keys 320 and the search key 324. A page number searching unit 344 gives the control unit an instruction of a page number of the optical disk 5 to be reproduced. This instructed page number is also set in the page number counter 342 to be displayed on the display 322.

Digital image information read by the optical head 336 is given a required signal processing such as an amplification processing by the signal processing circuit 346, and is outputted to the data-developing unit 348. When the image information is recorded in the optical disk 5, the digital image information is data-developed by the data-developing unit 348 to be stored in the image memory 350 since the image information is data-compressed by, e.g., modified READ, an international facsimile standard.

A display operation unit 352 controls the display on the flat display 312. Usually the image information stored in the image memory 350 is displayed as it is, but when the zoom key 328 is given an instruction, a part pointed by the translation key 326 is displayed enlarged or diminished.

The management data of the image information recorded in the optical disk 5 are recorded in the management data region of the optical disk 5. The management data of the optical disk 5 is read when the cartridge 4 is mounted. The read management data is converted by a data developing unit 348 into image information in letter patterns supplied by the letter pattern generating unit 349 to be stored in an image memory 350 and displayed on the flat display 312.

A printer 360 is connected to the body 310 as required to make a hard copy of the image information currently displayed on the flat display 312. The printer may comprise one that is usually used as a terminal device of a personal computer or a facsimile, which is widely used.

The operation of this example will be explained below.

A cartridge 4 containing an optical disk 4 to be reproduced is inserted through the cartridge receiving opening 314. The optical disk 5 used in this example has image information recorded in units of pages in the sequential order of pages. The optical disk 5 has a disk name DL and titles T of the respective documents recorded in the management data region, and the cartridge 4 has the disk name DL indicated on the outside thereof, whereby the cartridge 4 containing the optical disk 5 can be handled like a usual file or a book.

When the cartridge 4 is inserted, the optical disk 5 is mounted on the motor 332 and starts to be rotated. When the optical disk 5 reaches a required rotation number, the optical head 336 reads the management data in the management data region, and the disk name, titles of the documents and page numbers are displayed on the flat display 332. From this displayed management data, an operator can see the contents of the optical disks 5.

Looking at the contents of the optical disk 5 displayed on the flat display 332, the operator points to a page number of the document he wants by the ten keys 320. Then the head driving unit 338 drives the optical head 336 to read the pointed page number. When the pointed page number is larger than a last recorded page number, the display 322 displays to the effect. Then the optical head 336 reads the image information of the pointed page number, and then the image memory 350 stores the read image information via the signal processing unit 346 and the data developing unit 348. The stored image information is displayed on the flat display 131.

When the operator wants to see pages preceding or following the pointed page number, the search key 324 is used to advance or retreat the page number to display the images thereof.

When the image of the pointed page number is displayed, the zoom key 328 or the translation key 326 are used as required to enlarge or diminish a part of the image. When the operator wants a hard copy of the image, the printer 360 is connected to print the image on a paper.

When the operator finishes the operation, he pushes the button 315 by the cartridge receiving opening 314 to eject the cartridge 4.

Thus the reproduction only optical disk device can very readily reproduce the image information recorded in an optical disk and also make hard copies thereof as required. This optical device has only minimum necessary functions, and thus its price can be kept lowest.

It is possible to separate the display device (not shown) having the flat display 312 and the operation panel 318, and a reproducing unit (not shown) for reproducing an optical disk 5 from each other and instead connect both by a line. For example, the reproducing device is built in a work desk (not shown) and a connector for connection to the display device is provided on the work desk, and the display device is connected to the connector as required to reproduce images. This can much contribute to the paperless system in offices.

It is also possible that one reproducing device is connected to a plurality of display devices. For example, respective desks in a conference room have their own display devices thereon, whereby a conference will be smoothly advanced.

2. Second Embodiment

The simple electronic file system according to a second embodiment of this invention will be explained with reference to drawings.

2.1 Summary of the Simple Electronic File System

In the first embodiment this invention is adapted to an office. But in this embodiment this invention is adapted to personal lives.

Figure 15:
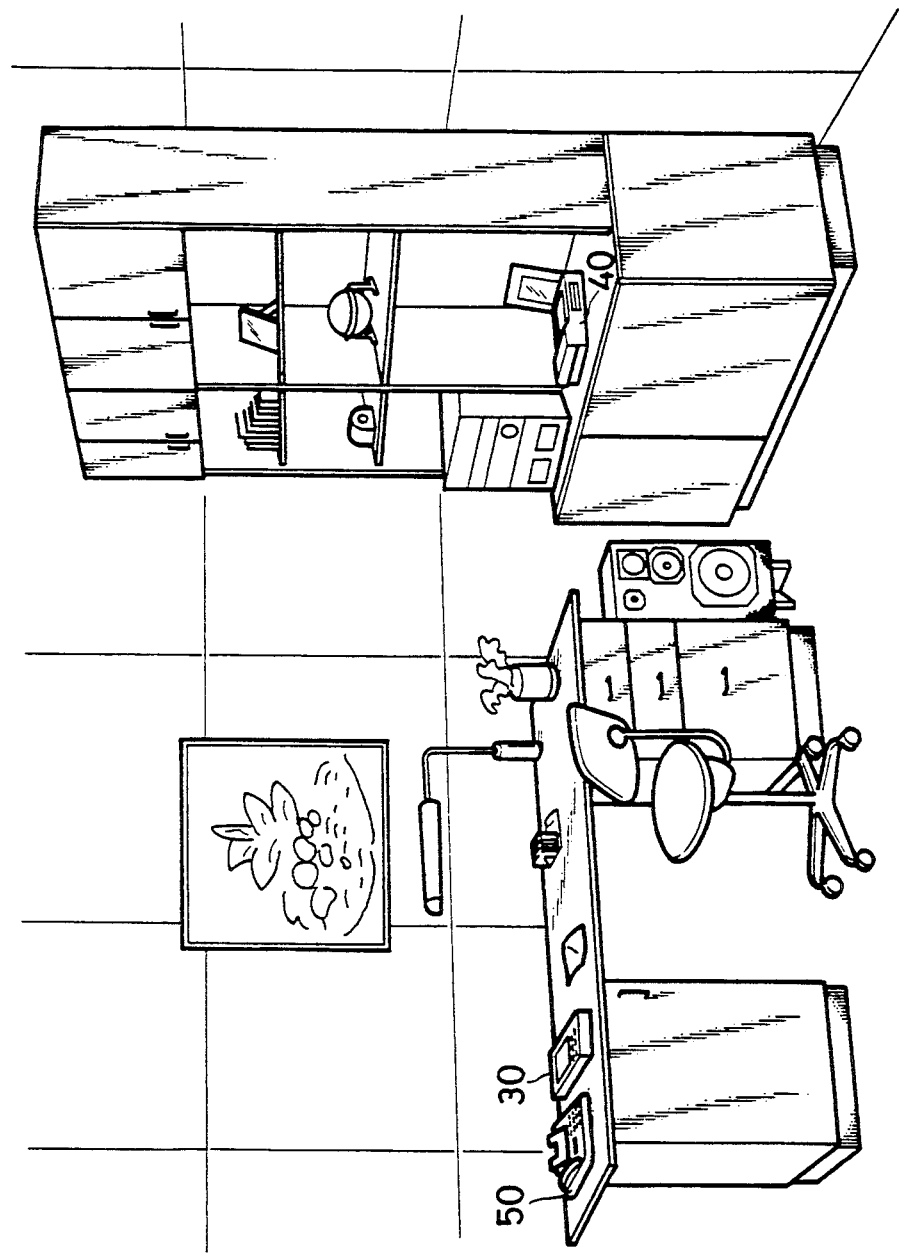
FIG. 15 is a view of the simple electronic file system according to a second embodiment of this invention, which is used in a study.

FIG. 15 shows an example of studies for which the simple electronic file system according to this embodiment is adapted to.

The simple electronic file system used in this study comprises an optical disk device with an image scanner 40 for recording a document in an optical disk and erasing all the recorded documents in the optical disk, and a reproduction only optical disk device 30 for reproducing the documents recorded in the optical disk. The optical disk device with an image scanner 40 is placed on a shelf by a wall of the study, and the reproduction only optical disk device 30 is placed on a desk in the study. A telephone/facsimile device 50 is placed by the reproduction only optical disk device 30 on the desk. This facsimile device 50 functions as a printer which makes a hard copy of a document reproduced by the reproduction only optical disk device 30.

Figure 16:
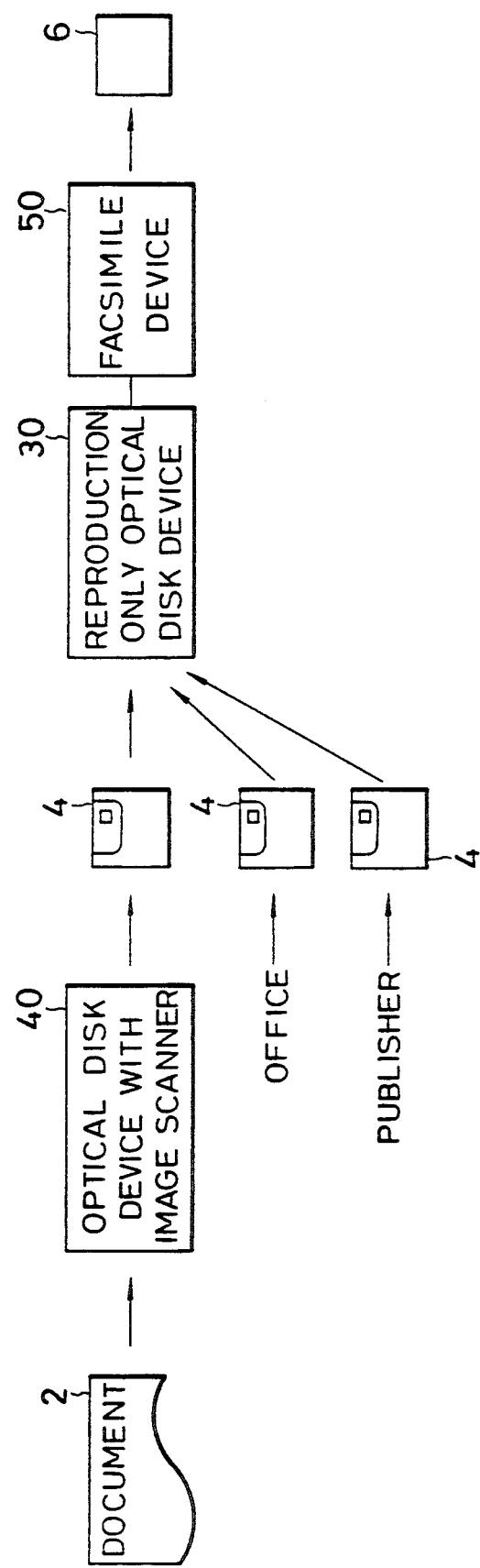
FIG. 16 is a flow chart of recording, storage, reproduction and erasion of the simple electronic file system of FIG. 15.

The flow of the recording, storing and reproduction of a document by the simple electronic file system according to this embodiment will be explained with reference to FIG. 16.

Documents to be recorded on personal levels, e.g., albums, letters, clips of newspapers, etc., are recorded in optical disks by the optical disk device with an image scanner 40. The recorded optical disks are kept, e.g., on book shelves. The optical disks are reproduced by the reproduction only optical disk device 30 to see the recorded documents. Optical disks to be reproduced are those recorded personally by the optical disk device with an image scanner 40 and optical disks which have been taken home for jobs, books published in optical disks, etc. When a reproduced document has to be printed, the facsimile device 50 is connected to the reproduction only optical disk device 30 to make a hard copy of the document.

For the retrieval for the simple electronic file system according to this embodiment, as in the first embodiment, a document is recorded in the unit of page, and auxiliary information, such as a disk name DN, titles TL, etc. is used, 2.2 Optical Disk Device with an Image Scanner An example of the optical disk device with an image scanner used in the simple electronic file system according to this embodiment will be explained with reference to FIGS. 17 and 18.

Figure 17:
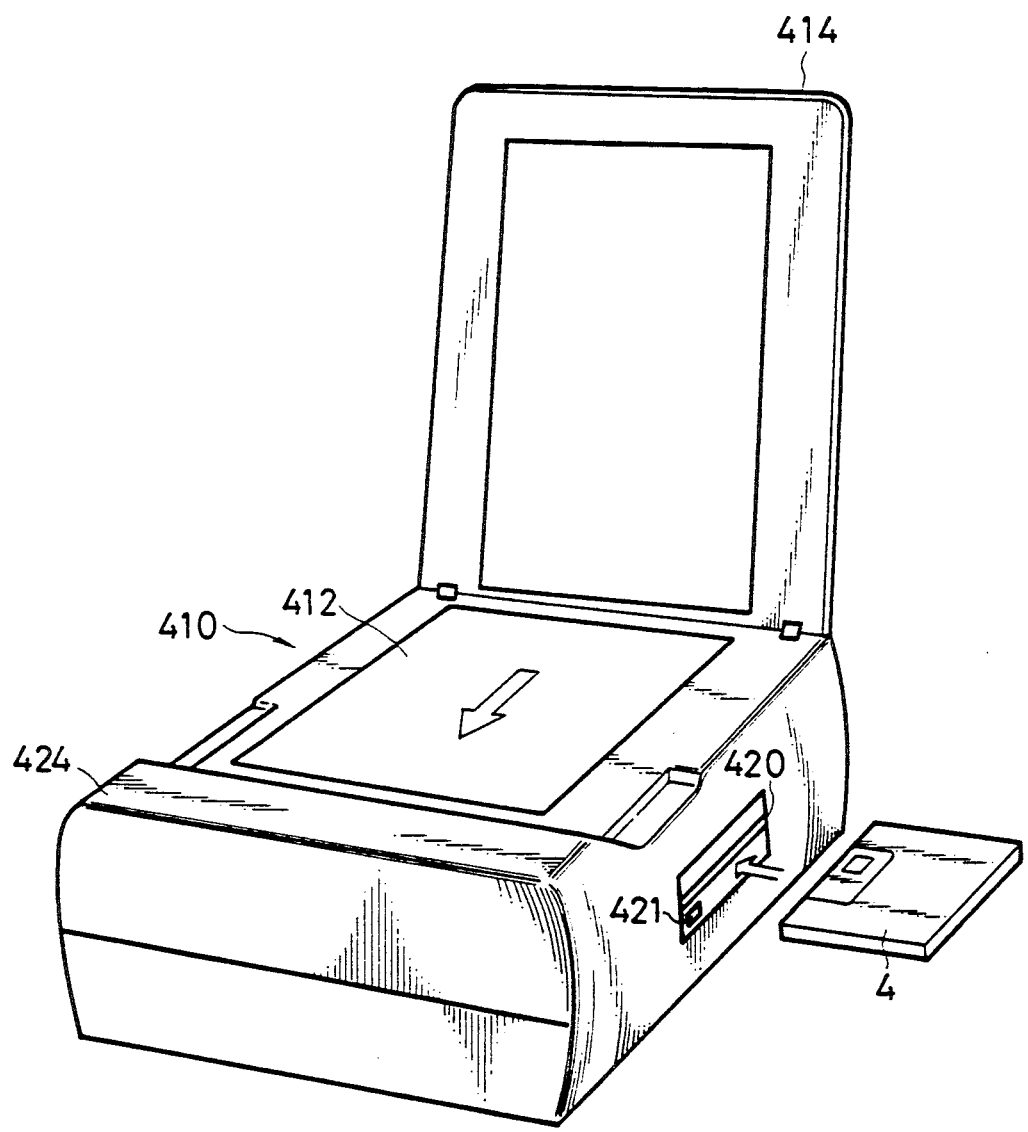
FIG. 17 is a perspective view of an appearance of the optical disk device with an image scanner used in the simple electronic file system of FIG. 15.

As shown in FIG. 17, the optical disk device with an image scanner according to this example comprises. as does a usual image scanner, an original table 412 for a document to be placed on disposed on the top of a body 410, and a original cover 414 for pressing an original.

A cartridge receiving opening 420 is formed in the right side of the body 410. A cartridge 4 for an optical disk is inserted thorough the cartridge receiving opening 420. A push button 421 is pushed to eject the cartridge 4.

The body 410 has an operation panel 424 for the usual operations of the image scanner and the optical disk disposed on this side of the original table 412 on the top of the body.

Figure 18:
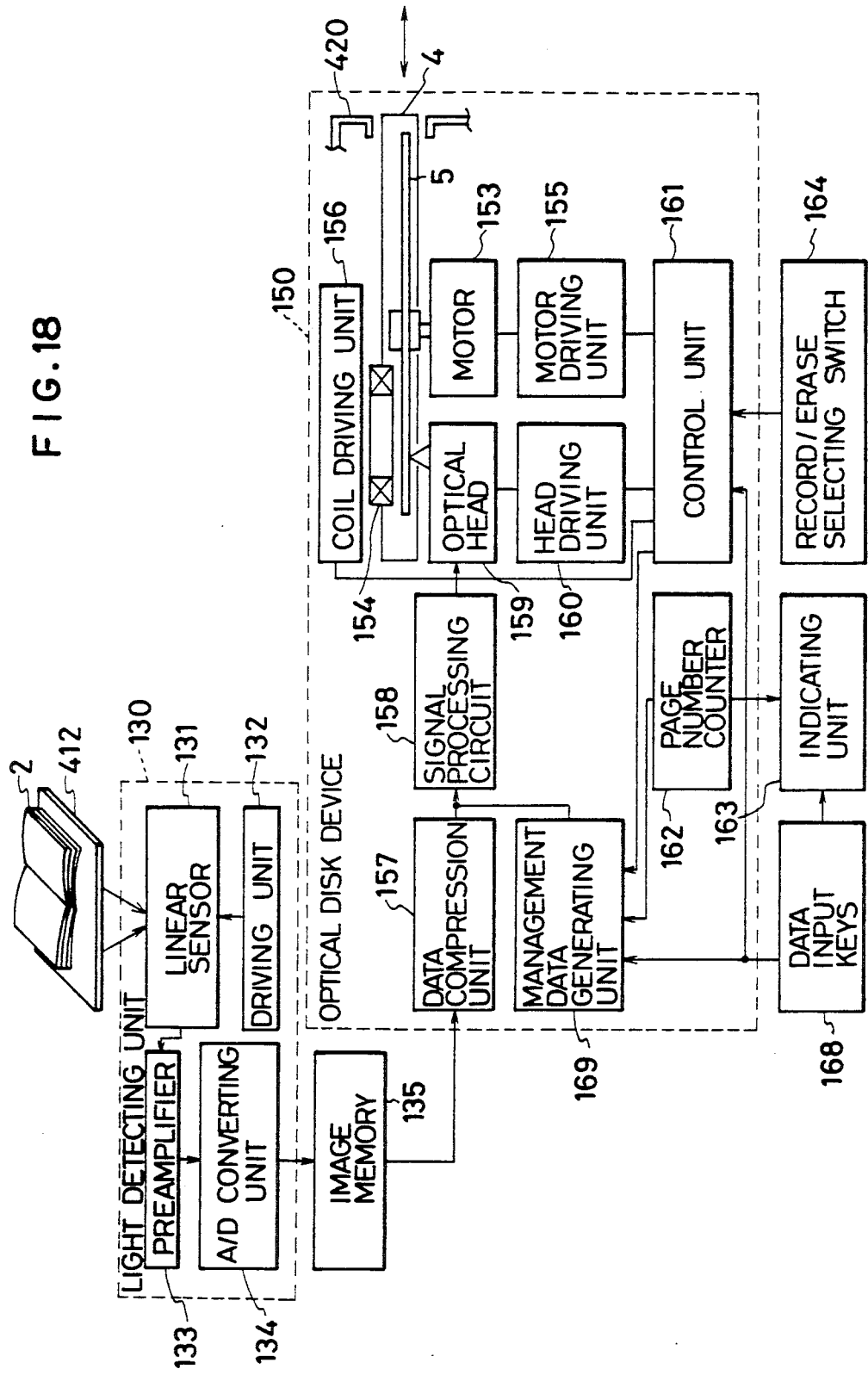
FIG. 18 is a block diagram of the optical disk device with an image scanner of FIG. 17.

FIG. 18 shows the details of the optical disk device with an image scanner according to this example. Common members with the copying machine with an optical disk device according to the first embodiment of FIG. 6 have common reference numerals not to repeat their explanations.

As shown in FIG. 18, the optical disk device with an image scanner according to this example has the same structure as the copying machine with an optical disk device of FIG. 6 without the laser printer unit 140. That is, a document on the original table 412 is converted into digital image information by a light detecting unit 130 to be stored in an image memory 135. A linear sensor 131 is operated in the scanning direction indicated by the arrow in FIG. 17 to read the document.

An optical disk device 150 records the digital image information stored in the image memory 135 in an optical disk 5 or erases all the recorded image information of the optical disk 5 as required.

The digital image information read from the image memory 135 by the optical disk device 150 is data-compressed by a data compression unit 157, e.g., is data-compressed by the modified READ, international facsimile standards to be recorded in the optical disk 5.

The optical disk device 150 has the same structure as that of FIG. 6, and it is not explained.

A flat display (not shown) may be provided so that the image information recorded in the optical disk 5 is read by the optical disk device 150 and displayed. In this case, a page number to be reproduced is designated by a page number to be reproduced designating unit provided on the operation panel 124. Then the image information is read from the optical disk 5 and is subjected to a required signal processing and data development to be stored in the image memory 135. The flat dislay may be any display means, such as a liquid crystal panel, EL display panel, plasma display panel, or others.

The operation of this example will be explained below.

Operation of Disk Record Mode

This operation is for the record mode selected by a recording/erasion selecting switch 164.

Before a document 2 to be inputted is set on the original desk 412, a cartridge 122 is inserted through a cartridge receiving opening 420. Then an optical disk 5 is mounted on a motor 153, and the optical disk 5 increases its rotation number up to a set rotation number. When the optical disk 5 reaches the set rotation number, an optical head 159 reads contents of a management data region, and a last page number currently being recorded is set in a page number counter 162.

With the document 2 placed on the original table 412, a start switch (not shown) is pushed. Then the image information is read by the light detection unit to be converted into digital image information. The converted image information is stored in the image memory 135. This image information is data-compressed by the data-compression unit 157, and further signal-processed by the signal processing circuit 158 to be supplied to the optical head 159.

A control unit 161 gives a head driving unit 160 an instruction of a track number TN and a sector number SN corresponding to a page next to the last page number stored in the page number counter 162. Based on this instruction, the head driving unit 160 drives the optical head 159 so that the optical head 159 is positioned at the track and the sector where the image information is to be recorded and records the image information. When the recording is over, the control unit 161 increases a page number of the page number counter 162 by 1, while writing titles TL and page addresses PA in the management data region.

Operation of Disk Initialization Mode

When erasion mode is selected by the recording/erasion selecting switch 164, the control unit 161 controls a coil driving unit 156 and the head driving unit 160 to initialize the optical disk 5. In the initialization all the tracks of the optical disk 5 are erased sequentially one by one. It is possible to display to the effect during an initialization.

3. A Modification

This invention is not limited to the above-described embodiments but covers various modifications.

In the above-described embodiment, the simple electronic file system comprises a copying machine with an optical disk device, and a reproduction only optical disk device but may further comprise an optical disk device with an image scanner for the optical disk recording. The second embodiment may further comprise a copying machine with an optical disk.

In the above-described embodiments, erasable magneto-optical disks are used, but similarly erasable phase changeable optical disks may be used. Direct read after write optical disks, which are not erasable and store once recorded information permanently. The direct read after write optical disks can store information recorded on papers compactly as does the conventional microfilm.

In the above-described embodiments, for the retrieval, disk names and document titles are used as an assistance to the page-unit retrieval. In order to further simplify the electronic file system according to this invention, it is possible to use only page numbers for retrieval.

INDUSTRIAL APPLICABILITY

In the simple electronic file system according to this invention, an optical disk cartridge has a capacity substantially corresponding to a usual paper file volume, and the retrieval is conducted in units of pages. This makes it possible to simplify recording of a document in optical disks and retrieval of the document therefrom, and in addition, the optical disk cartridge can be handled in the same way as usual files. Accordingly, this simple electronic file system is usable as a ready file system suitably used in offices and at home.

I claim:

1. A simple electronic file system comprising:
a copying machine with an optical disk device having a light detecting unit for converting an optical image of a document into digital image information; an image storing unit for storing the digital image information converted from the light detecting unit; a printer unit for printing the digital image information on paper; an optical disk unit for recording the digital image information in an optical disk contained in a replaceable optical disk cartridge in units of pages, wherein the optical disk unit of the copying machine with an optical disk device erases the information recorded in the optical disk; and a selection unit for selecting whether the digital image information will be printed by the printer unit or not, and whether the digital image information will be recorded by the optical disk unit or not; and a reproduction only optical disk device having a selection unit for selecting one of the pages recorded in the optical disk in the optical disk cartridge to be reproduced; an optical disk unit for reading the digital image information of the page selected by the selection unit; an image storing unit for storing the digital image information read by the optical disk unit; and a flat display unit for displaying the image information stored in the image storing unit, the copying machine with the optical disk device recording in the optical disk the image information of the document in units of pages, and the reproduction only optical disk device reproducing the image information recorded in the optical disk in units of pages.

2. A simple electronic file system comprising:
a copying machine with an optical disk device having a copying unit having an optical system for forming an optical image of a document and reproducing the formed optical image on paper; a light detecting unit for taking out the optical image of the document from the optical system of the copying unit and converting the optical image into digital image information; an image storing unit for storing the digital image information converted by the light detecting unit; an optical disk unit for recording the digital image information in units of pages in an optical disk contained in a replaceable optical disk cartridge, wherein the optical disk unit of the copying machine with an optical disk device erases the information recorded in the optical disk; and a selection unit for selecting whether the digital image information will be reproduced by the copying unit or recorded by the optical disk unit; and a reproduction only optical disk device having a selection unit for selecting one of the pages recorded in the optical disk in the cartridge to be reproduced; an optical disk unit for reading the digital image information of the page selected by the selection unit from the optical disk; an image storing unit for storing the digital image information read by the optical disk unit; and a flat display unit for displaying the image stored in the image storing unit, the copying machine with the optical disk device recording in the optical disk the image information of the document in units of pages, and the reproduction only optical disk device reproducing the image information recorded in the optical disk in units of pages.

3. A simple electronic file system comprising:
a copying machine having an optical system for forming an optical image of a document and reproducing the formed optical image on paper;

an optical disk device mountable on the copying machine having a light detecting unit for converting the optical image of the document into digital image information and having a light sensor attached to the copying machine for optically detecting the reproduced image; an image storing unit for storing the digital image information converted by the light detecting unit; and a disk unit for recording the digital image information in units of pages in an optical disk contained in a replaceable optical disk cartridge, wherein the disk unit of the optical disk device erases the information recorded in the optical disk; and a reproduction only optical disk device having a selection unit for selecting one of the pages recorded in the optical disk in the cartridge to be reproduced; an optical disk unit for reading the digital image information of the page selected by the selection unit from the optical disk; an image storing unit for storing the digital image information read by the optical disk unit; and a flat display unit for displaying the image information stored in the image storing unit, the optical disk device recording in the optical disk the image information of the document in units of pages, and the reproduction only optical disk device reproducing the image information recorded in the optical disk in units of pages.

4. A simple electronic file system comprising:

an optical disk device with an image scanner having a light detecting unit for converting an optical image of a document into digital image information; an image storing unit for storing the digital image information converted by the light detecting unit; and an optical disk device for recording the digital image information in units of pages in an optical disk contained in a replaceable optical disk cartridge, wherein the optical disk unit of the optical disk device with an image scanner erases the information recorded in the optical disk; and a reproduction only optical disk device having a selection unit for selecting one of the pages recorded in the optical disk in the cartridge to be reproduced; an optical disk unit for reading the digital image information of the page selected by the selection unit from the optical disk; an image storing unit for storing the digital image information read by the optical disk unit; and a flat display unit for displaying the image information stored in the image storing unit, the optical disk device with the image scanner recording the image information of the document in the optical disk in units of pages, and the reproduction only optical disk device reproducing the image information recorded in the optical disk in units of pages.

5. A simple electronic file system comprising:

an optical disk device with an image scanner having a light detecting unit for converting an optical image of a document into digital image information; an image storing unit for storing the digital image information converted by the light detecting unit; and an optical disk device for recording the digital image information in units of pages in an optical disk contained in a replaceable optical disk cartridge;

a reproduction only optical disk device having a selection unit for selecting one of the pages recorded in the optical disk in the cartridge to be reproduced; an optical disk unit for reading the digital image information of the page selected by the selection unit from the optical disk; an image storing unit for storing the digital image information read by the optical disk unit; and a flat display unit for displaying the image information stored in the image storing unit; and a facsimile device for printing the digital image information stored in the image storing unit of the reproduction only optical disk device;

the optical disk device with the image scanner recording the image information of the document in the optical disk in units of pages, and the reproduction only optical disk device reproducing the image information recorded in the optical disk in units of pages.

6. A simple electronic file system comprising:

a copying machine with an optical disk device having a light detecting unit for converting an optical image of a document into digital image information; an image memory unit for storing the digital image information converted from the light detecting unit; an optical disk unit for recording the digital image information in an optical disk contained in a replaceable optical disk cartridge in units of pages and for erasing the information recorded in the optical disk; a selection unit for selecting whether the digital image information will be printed by a printer unit or recorded by the optical disk unit; and a display for displaying the image information stored by the image memory unit; and a reproduction only optical disk device having a selection unit for selecting one of the pages recorded in the optical disk in the optical disk cartridge to be reproduced; an optical disk unit for reading the digital image information of the page selected by the selection unit; an image memory for storing the digital image information read by the optical disk unit; and a flat display for displaying the image information stored by the image storing unit, the copying machine with an optical disk device recording in the optical disk the image information of the document in units of pages, and the reproduction only optical disk device reproducing the image information recorded in the optical disk in units of pages.

7. A simple electronic file system comprising:

a copying machine with an optical disk device having a copying unit having an optical system for forming an optical image of a document and reproducing the formed optical image on paper; a light detecting unit for taking out the optical image of the document from the optical system of the copying unit and converting the optical image into digital image information; an image memory unit for storing the digital image information converted by the light detecting unit; an optical disk unit for recording the digital image information in units of pages in an optical disk contained in a replaceable optical disk cartridge and for erasing the information recorded in the optical disk; a selection unit for selecting whether the digital image information will be reproduced by the copying unit or recorded by the optical disk unit; and a display for displaying the image information stored by the image memory unit; and a reproduction only optical disk device having a selection unit for selecting one of the pages recorded in the optical disk in the cartridge to be reproduced; an optical disk unit for reading the digital image information of the page selected by the selection unit from the optical disk; an image memory for storing the digital image information read by the optical disk unit; and a flat display for displaying the image information stored by the image memory unit, the copying machine with an optical disk device recording in the optical disk the image information of the document in units of pages, and the reproduction only optical disk device reproducing the image information recorded in the optical disk in units of pages.

8. A simple electronic file system comprising:

a copying machine having an optical system for forming an optical image of a document and reproducing the formed optical image on paper;

a copying machine adaptable optical disk device having a light detecting unit for converting the optical image of the document into digital image information and having a light sensor attached to the copying machine for optically detecting the reproduced image; an image memory unit for storing the digital image information converted by the light detecting unit; a disk unit for recording the digital image information in units of pages in an optical disk contained in a replaceable optical disk cartridge and for erasing the information recorded in the optical disk; and a display unit for displaying the image information stored by the image memory unit; and a reproduction only optical disk device having a selection unit for selecting one of the pages recorded in the optical disk in the cartridge to be reproduced; an optical disk unit for reading the digital image information of the page selected by the selection unit from the optical disk; an image memory for storing the digital image information read by the optical disk unit; and a flat display for displaying the image information stored by the image memory unit, the copying machine adaptable optical disk device recording in the optical disk the image information of the document in units of pages, and the reproduction only optical disk device reproducing the image information recorded in the optical disk in units of pages.

9. A simple electronic file system according to any one of claims 1, 2, 3, 4, 5 or 6-8, wherein the optical disk has a management data region where management data is recorded, the management data having a disk name which is the name of the optical disk, document titles which represent the contents of the documents, and page addresses which indicate the positions of the pages where the documents are recorded; and, in recording, the management data as well is recorded in the optical disk and, in reproduction, a page to be reproduced is designated based on the management data.

* * * * *